United States Patent
Miyazaki et al.

(10) Patent No.: US 7,072,058 B1
(45) Date of Patent: Jul. 4, 2006

(54) IMAGE PROCESSING APPARATUS

(75) Inventors: Hideto Miyazaki, Kanagawa (JP);
Yoshiyuki Namizuka, Kanagawa (JP);
Yuji Takahashi, Kanagawa (JP);
Yasuyuki Nomizu, Kanagawa (JP);
Sugitaka Oteki, Tokyo (JP); Takako Satoh, Kanagawa (JP); Rie Ishii, Tokyo (JP); Takeharu Tone, Tokyo (JP);
Hiroaki Fukuda, Kanagawa (JP);
Shinya Miyazaki, Tokyo (JP); Fumio Yoshizawa, Kanagawa (JP); Hiroyuki Kawamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 814 days.

(21) Appl. No.: 09/706,783

(22) Filed: Nov. 7, 2000

(30) Foreign Application Priority Data

Nov. 24, 1999 (JP) ................................. 11-333297

(51) Int. Cl.
*G06F 15/00* (2006.01)
(52) U.S. Cl. .................. 358/1.15; 358/1.14; 358/1.16; 358/1.17; 358/1.9; 358/444
(58) Field of Classification Search ............... 358/444, 358/1.16, 1.17, 505, 404, 448, 1.9, 1.14, 358/1.15; 399/151; 355/84
See application file for complete search history.

(56) References Cited

U.S. PATENT DOCUMENTS

| 5,050,221 | A | | 9/1991 | Ohta et al. |
|---|---|---|---|---|
| 5,410,619 | A | | 4/1995 | Fujisawa et al. |
| 5,764,866 | A | * | 6/1998 | Maniwa ...................... 358/1.15 |
| 6,041,139 | A | | 3/2000 | Okubo et al. |
| 6,064,490 | A | * | 5/2000 | Minamizawa ............... 358/1.14 |
| 6,563,603 | B1 | * | 5/2003 | Yamazaki .................... 358/1.9 |
| 6,603,570 | B1 | * | 8/2003 | Asahi ......................... 358/1.15 |

FOREIGN PATENT DOCUMENTS

| JP | 5-20286 | 1/1993 |
|---|---|---|
| JP | 6-237330 | 8/1994 |
| JP | 9-091129 | 4/1997 |
| JP | 11-4315 | 1/1999 |
| JP | 3096114 | 8/2000 |

OTHER PUBLICATIONS

U.S. App. No. 10/805,184, filed Mar. 22, 2004, Namizuka.
U.S. App. No. 10/797,129, filed Mar. 11, 2004, Nomizu.
U.S. Appl. No. 11/166,192, filed Jun. 27, 2005, Namizuka, et al.

(Continued)

*Primary Examiner*—Kimberly Williams
*Assistant Examiner*—Satwant Singh
(74) *Attorney, Agent, or Firm*—Oblon, Spivak, McClelland, Maier & Neustadt, P.C.

(57) ABSTRACT

An image processing apparatus is connected to a plurality of functional units including an image processor which processes images. A process controller provides control over the entire operation. A ROM previously stores information about the content of the image processing. The process controller reads the information stored in the ROM and transfers this information in a host buffer provided with the image processor. The image processor processes the image data based on the information stored in the host buffer.

17 Claims, 20 Drawing Sheets

OTHER PUBLICATIONS

U.S. Appl. No. 10/360,749, filed Feb. 10, 2003, Namizuka.
U.S. Appl. No. 10/393,945, filed Mar. 24, 2003, Namizuka.
U.S. Appl. No. 10/632,957, filed Aug 4, 2003, Namizuka.
U.S. Appl. No. 10/641,049, filed Aug 15, 2003, Nomizu.
U.S. Appl. No. 10/663,804, filed Sep. 17, 2003, Togami et al.
U.S. Appl. No. 10/687,625, filed Oct 20, 2003, Kawamoto et al.
U.S. Appl. No. 10/663,784, filed Sep. 17, 2003, Shirata et al.
U.S. Appl. No. 10/668,360, filed Sep. 24, 2003, Ohyama et al.

\* cited by examiner

|  | COLUMN | | | | |
|---|---|---|---|---|---|
|  | j-2 | j-1 | j | j+1 | j+2 |
| i-2 | A | B | C | D | E |
| i-1 | F | G | H | I | J |
| ROW i | K | L | M | N | O |
| i+1 | P | Q | R | S | T |
| i+2 | U | V | W | X | Y |

IMAGE PROCESSING APPARATUS

FIELD OF THE INVENTION

The present invention relates in general to an image processing apparatus. More particularly, this invention relates an image processing apparatus which can process image data in a digital combined machine (a machine in which functions of a copying machine, a facsimile machine, a printer, a scanner and the like are combined).

BACKGROUND OF THE INVENTION

In recent years, there has become widely available an image processing apparatus of an analog type. Furthermore, there has being widespread a digital copying machine for processing digitized image data at the requests of recent technical enhancement and color images in addition to conventional analog image processing apparatus.

Moreover, instead of a product exclusive to an individual use such as a copying apparatus having only a copying function, a facsimile apparatus having only a facsimile function or a scanner apparatus having only a scanning function, there has existed a so-called digital combined machine in which the copying function, facsimile function and scanning function are combined with each other. FIG. 21 is a block diagram illustrating the hardware configuration of a digital combined machine in the prior art.

As illustrated in the block diagram of FIG. 21, the digital combined machine 2100 comprises a reading unit 2101 for reading image data; an image processing unit 2102 for processing the read image data; a video controller 2103 for exerting various kinds of control on the image data; and a writing unit 2104 for outputting the processed image data onto a recording sheet.

Furthermore, constituent elements constituting a copying machine (i.e., the section of a copying machine) consisting of a memory control unit 2105 for controlling the storage of the image data and a memory module 2106 for holding the image data are connected to a facsimile control unit 2112 for additionally controlling facsimile transmission/reception, a printer control unit 2113 for controlling an input of image data sent from a personal computer connected to the outside, a scanner control unit 2114 for controlling an input/output of the image data in the case where the digital combined machine 2100 is used as a scanner and the like via a motherboard 2111. Consequently, it is possible to achieve various functions as the digital combined machine 2100.

Therefore, the section of the copying machine for serving the function as the copying machine comprises the reading unit 2101, the image processing unit 2102, the video controller 2103 and the writing unit 2104, where a series of operations are controlled by a system controller 2107, a RAM 2108 and a ROM 2109. Each of the facsimile control unit 2112, the printer control unit 2113 and the scanner control unit 2114 serves its own function by using a part of the series of operations established in the copying machine.

In other words, the function of the digital combined machine can be served by adding the facsimile control unit 2112, the printer control unit 2113 or the scanner control unit 2114 on the section of the copying machine constituted of the above-described group of constituents as one system.

In the above-described digital combined machine, a plurality of diverse kinds of image processing are performed in the video controller 2103 via the system controller 2107, and further, in the facsimile control unit 2112, the printer control unit 2113 and the scanner control unit 2114 via the motherboard 2111.

Moreover, instead of the digital combined machine in which the above-described units are added on the copying machine, there has been devised another digital combined machine, in which the functional section of the printer, the functional section of the facsimile and the functional section of the scanner are configured into units, the image data input from which is unitarily processed in a unit responsible for control or processing such as an image data control unit or an image processing unit under the control of a control unit for controlling the processing of the entire apparatus, although not shown.

Since such a digital combined machine is not designed in such a manner as to mainly orient to the copying machine, the image processing in the function of the copying machine is not specified. Therefore, it is possible to effectively use resources, to control the image data input or output from each of the units in the control unit, and to appropriately perform the image processing with efficiency. For example, when the reading resolution of the functional section of the copying machine is enhanced, it is unnecessary to re-design or re-construct all of the units according to the functional section of the copying machine, and thus, it is possible to appropriately perform the image processing with efficiency only by replacing the functional section of the copying machine.

In particular, Japanese Patent Application Laid-open No. 237330/1994 titled "Image formation managing system" as the technique of achieving efficient image processing discloses the technique in which it is determined whether or not an apparatus is in an inoperative state, and then, a predetermined processing procedure (program) is loaded down in the case of the inoperative state; otherwise, predetermined data is loaded up at the optimum time except for the case where there is high possibility of use of the apparatus.

When the above-described technique is applied to the image processing, the processing procedures or parameters relating to the image processing required for a next operation are previously transferred in the inoperative state of the apparatus to achieve the efficient image processing in the digital combined machine in which a plurality of kinds of image processing need be performed.

Alternatively, Japanese Patent Application Laid-open No. 91129/1997 titled "Image processing apparatus and method therefor" discloses an image processing apparatus and a method therefor which can continuously serve an operative function as it is irrespective of operation of a control program even during re-writing of a control program of the apparatus.

When the above-described technique is applied to the image processing, it is possible to enhance the productivity of a digital combined machine which need perform various kinds of image processing or control.

However, the prior art technology has experienced problems as described below. For example, when "the image formation managing system" disclosed in Japanese Patent Application Laid-open No. 237330/1994 is applied to the digital combined machine (the image processing apparatus), the modification or addition of a processing program is restricted in the inoperative state of the apparatus. Consequently, there has arisen a problem that even if the necessity of the image processing based on a copying operation occurs during the image processing based on facsimile reception, it is impossible to change the processing program based to that on the copying operation.

"The image processing apparatus and the method therefor" disclosed in Japanese Patent Application Laid-open No. 91129/1997 is directed to mainly an update of a program, where a program is not rewritten if it is not rewrittable; otherwise, the program is rewritten if it is rewrittable. Therefore, there has arisen a problem that at the request of image processing during another image processing, the image processing cannot be performed without deterioration of productivity.

Furthermore, in the digital combined machine in which each of the copying machine functional section, the facsimile functional section, the printer functional section, the control functional section and the image processing functional section and the like is configured into a unit, the efficiency in transferring the procedures or various parameters for the image processing to the image processing functional section may be relatively reduced as the result that various kinds of control processing are concentrated in the control unit responsible for the control of each processing. In view of this, there has been demanded for an image processing apparatus capable of efficiently performing a plurality of image processing without degrading the productivity.

Moreover, in order to prevent any deterioration of transferring efficiency in the control unit, if only the control section for transferring the procedures or various parameters for the image processing to the image processing functional section is configured independently of the other sections, special hardware is additionally required, thereby inducing an increase in cost, and further, departing from the object of the digital combined machine in which each of the functional sections is configured in a unit per function so as to effectively use each of the resources and appropriately perform the image processing with efficiency.

SUMMARY OF THE INVENTION

It is an object of the present invention to provide an image processing apparatus capable of effectively using each of resources of the processing apparatus and of efficiently performing a plurality of image processing without degrading the productivity even during the operation of the apparatus.

The image processing apparatus according to one aspect of the present invention functions as follows. That is, a storage unit is made to store information that indicates the contents of image processing, an entirety controlling unit reads a part of the information stored in the storage unit and transfers it to a memory provided in an image processing unit. The image processing unit performs image processing based on the information stored in the memory. Accordingly, even if the entirety controlling unit is busy doing some other processing, the image processing unit can perform the image processing.

Other objects and features of this invention will become apparent from the following description with reference to the accompanying drawings.

DESCRIPTION OF THE PREFERRED EMBODIMENTS

Figure 1:
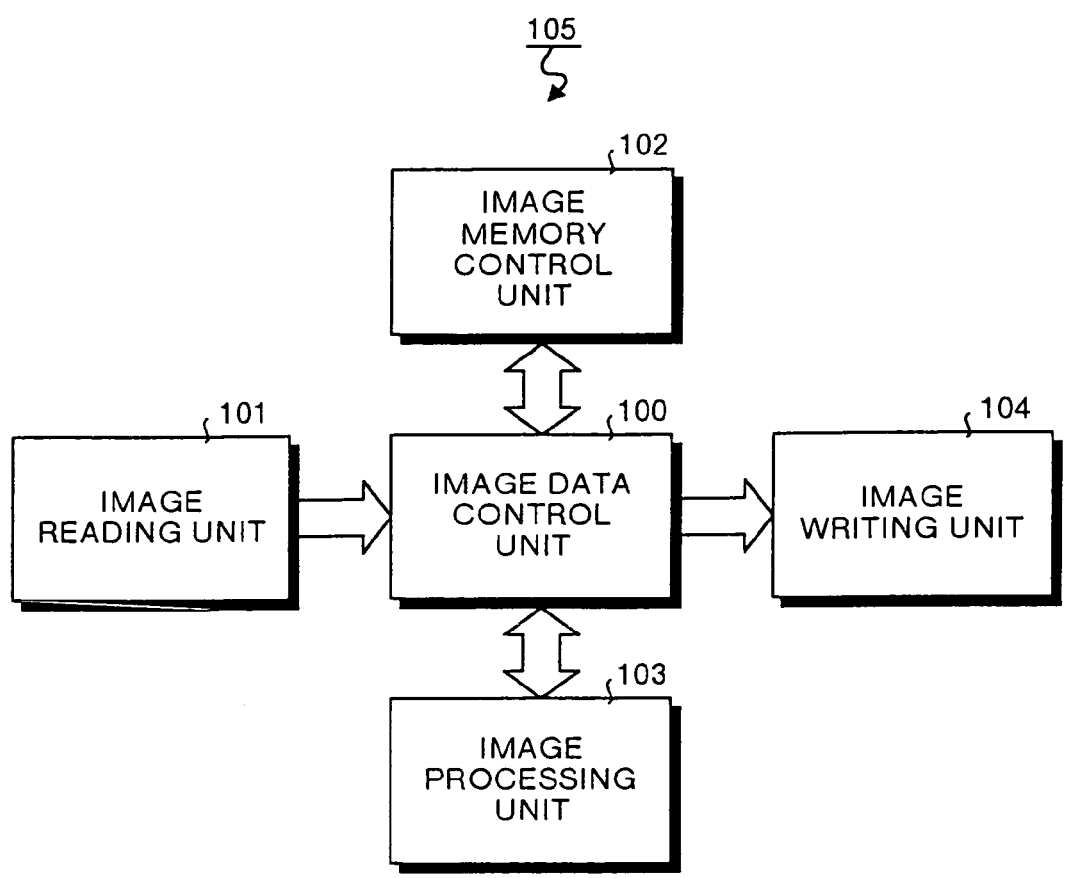
FIG. 1 is a block diagram functionally illustrating the arrangement of an image processing apparatus in a preferred embodiment according to the present invention.

An image processing apparatus in a preferred embodiment according to the present invention will be described below in reference to the drawings. First of all, explanation will be given about the principle of the image processing apparatus in the preferred embodiment. FIG. 1 is a block diagram functionally illustrating the arrangement of the image processing apparatus in the preferred embodiment according to the present invention. As shown in FIG. 1, the image processing apparatus 105 includes five units described below.

The above-mentioned five units are an image data control unit 100; an image reading unit 101 for reading and inputting image data; an image memory control unit 102 for controlling an image memory for storing an image therein so as to write/read the image data; an image processing unit 103 for subjecting the image data to image processing such as edition; and an image writing unit 104 for writing the image data in a transfer sheet (i.e. a paper) or the like.

The image reading unit 101, the image memory control unit 102, the image processing unit 103 and the image writing unit 104 are respectively connected to the image data control unit 100.

The image data control unit 100 undertakes the following processing:

(1) Data compressing processing (primary compression) for the purpose of enhancing the bus transfer efficiency of data;

(2) Processing of transferring the primarily compressed data to image data;

(3) Image synthesizing processing which enables image data from a plurality of units to be synthesized, and further, includes synthesizing the image data on a data bus;

(4) Image shifting processing which enables an image to be shifted in main and sub scanning directions;

(5) Image region expanding processing which enables an image region to be enlarged to the periphery by an arbitrary amount;

(6) Image scaling processing to, for example, a fixed scale of 50% or 200%;

(7) Parallel bus interface processing;

(8) Serial bus interface processing with a process controller 211, described later;

(9) Format converting processing between parallel data and serial data;

(10) Interface processing with the image reading unit 101; and

(11) Interface processing with the image processing unit 103.

The image reading unit 101 undertakes the following processing:

(1) Processing of reading light reflected on an original by means of an optical system;

(2) Processing of converting the light into an electric signal in a CCD (a Charge Coupled Device);

(3) Digitizing processing by means of an A/D (analog-to-digital) converter;

(4) Shading correcting processing of correcting unevenness of illumination distribution of a light source; and (5) Scanner γ correcting processing of correcting the concentration characteristics of a reading system.

The image memory control unit 102 undertakes the following processing:

(1) Interface control processing with a system controller;

(2) Parallel bus control processing of controlling an interface with a parallel bus;

(3) Network control processing;

(4) Serial bus control processing of controlling a plurality of outside serial ports;

(5) Inside bus interface control processing of controlling a command with respect to an operating unit;

(6) Local bus control processing of controlling accesses of the ROM, the RAM and font data for booting the system controller;

(7) Processing of controlling operation, e.g., a writing/reading operation, of a memory module;

(8) Memory module access control processing of conciliating requests for a memory access from a plurality of units;

(9) Data compressing/decompressing processing of reducing data for the purpose of memory effective use; and

(10) Image editing processing of, e.g., clearing data in a memory region, turning the image data, synthesizing images on a memory, and the like.

The image processing unit 103 undertakes the following processing:

(1) Shading correcting processing of correcting unevenness of illumination distribution of a light source;

(2) Scanner γ correcting processing of correcting the concentration characteristics of a reading system;

(3) MTF correcting processing;

(4) Smoothing processing;

(5) Arbitrarily scaling processing in a main scanning direction;

(6) Concentration varying processing corresponding to γ varying processing (a concentration notch);

(7) Simple multi-level processing;

(8) Simple binary processing;

(9) Error diffusing processing;

(10) Dithering processing;

(11) Dot arrangement phase control processing of arranging dots rightward or leftward;

(12) Isolated point eliminating processing;

(13) Image region separating processing such as color judgment, attribute judgment or adaptation; and

(14) Density varying processing.

The image writing unit 104 undertakes the following processing:

(1) Edge trimming processing, i.e., shagginess correcting processing;

(2) Dot re-arrangement correcting processing;

(3) Processing of controlling a pulse of an image signal; and (4) Processing of converting a format of parallel data or serial data.

Figure 2:
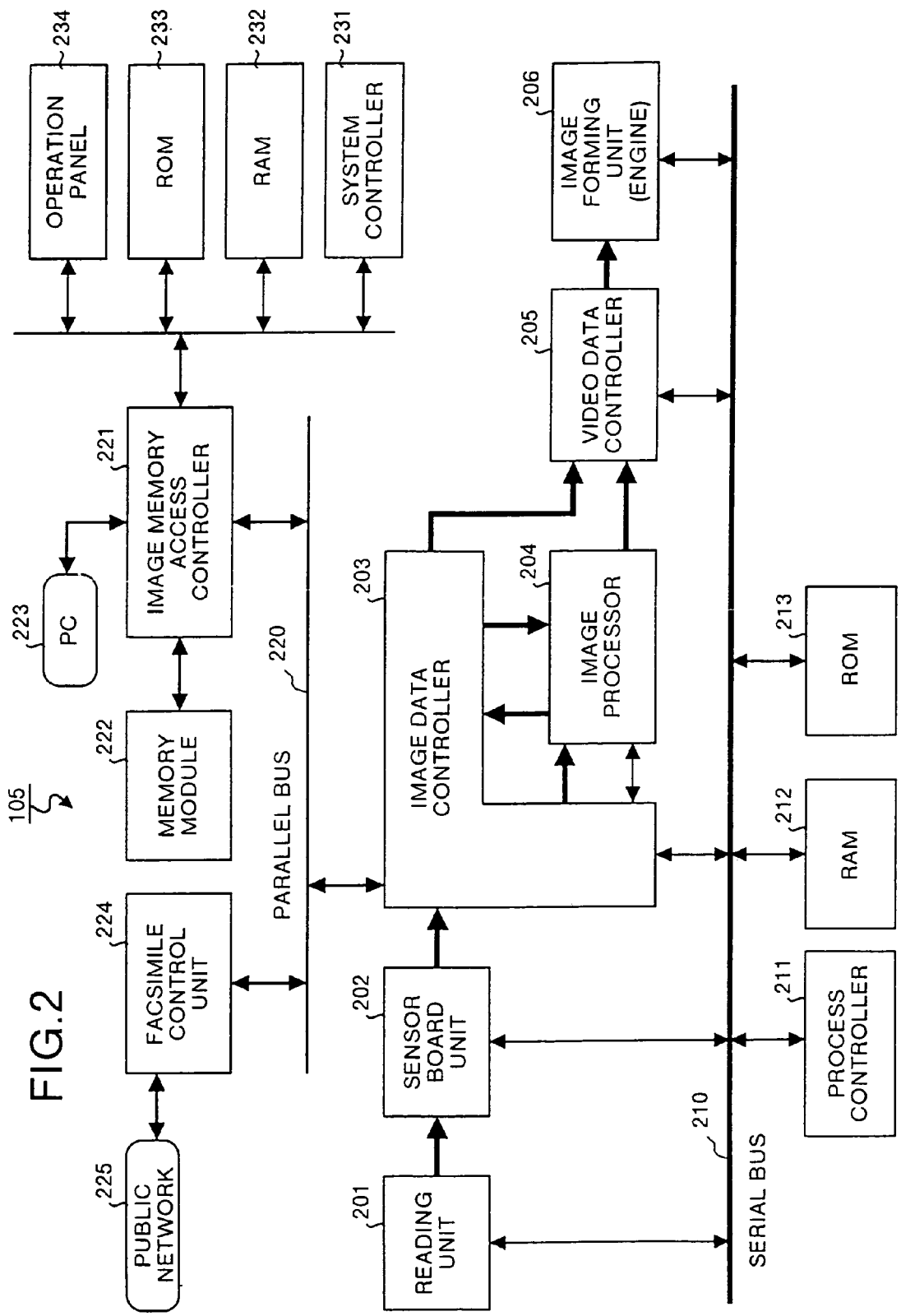
FIG. 2 is a block diagram illustrating one example of the hardware configuration of the image processing apparatus in the present embodiment.

Next, hardware configuration when the image processing apparatus 105 in the present embodiment is to be utilized as a digital combined machine will be explained here. FIG. 2 is a block diagram illustrating one example of the hardware configuration of the image processing apparatus in the present embodiment.

As shown in FIG. 2, the image processing apparatus 105 in the present embodiment comprises a reading unit 201, a sensor board unit 202, an image data controller 203, an image processor 204, a video data controller 205 and an image forming unit (engine) 206. The image processing apparatus 105 in the present embodiment further comprises a process controller 211, a RAM 212 and a ROM 213 via a serial bus 210.

Moreover, the image processing apparatus 105 in the present embodiment comprises an image memory access controller 221, a memory module 222 and a facsimile control unit 224 via a parallel bus 220, and a system controller 231, a RAM 232, a ROM 233 and a console panel 234, all of which are connected to the image memory access controller 221.

The correlation between the above-mentioned constituent elements and the units 100 to 104 illustrated in FIG. 1 will be explained here. Namely, the reading unit 201 and the sensor board unit 202 fulfill the function of the image reading unit 101 illustrated in FIG. 1. In the same manner, the image data controller 203 serves the function of the image data controller unit 100. Furthermore, in the same manner, the image processor 204 carries out the function of the image processing unit 103.

Moreover, in the same manner, the video data controller 205 and the image forming unit (engine) 206 fulfill the function of the image writing unit 104. Additionally, in the same manner, the image memory access controller 221 and the memory module 222 serve the function of the image memory control unit 102.

Next, explanation will be made on the contents of the constituent elements. The reading unit 201 for optically reading an original is constituted of a lamp, mirrors and lenses, in which light reflected on the original with irradiation by the lamp is focused on a light receiving element by the mirrors and the lenses.

The light receiving element, for example, a CCD, is mounted on the sensor board unit 202. Image data converted into an electric signal by the CCD is further converted into a digital signal, to be then output (transmitted) from the sensor board unit 202.

The image data output (transmitted) from the sensor board unit 202 is input into (received by) the image data controller 203. All the transmission of the image data between the functional devices (the processing units) and the data buses is controlled by the image data controller 203.

The image data controller 203 transfers the image data to the sensor board unit 202, the parallel bus 220 and the image processor 204, and transmits the image data to the process controller 211 and the system controller 231 which manages the entire control of the image processing apparatus 105.

The RAM 212 is used as a work area of the process controller 211. The ROM 213 stores therein a boot program for the process controller 211, a plurality of processing information consisting of image processing procedures required for various image processing to be performed by the image processor 204 and parameters required for the image processing, and other information required for the process control of the entire apparatus.

The image data output (transmitted) from the sensor board unit 202 is transferred (transmitted) to the image processor 204 via the image data controller 203, and then, deterioration of the signal (in the scanner system) associated with quantization to the optical system and a digital signal is corrected, thereby outputting (transmitting) the image data to the image data controller 203 again.

The image memory access controller 221 controls writing/reading of the image data in/from the memory module 222. Furthermore, the image memory access controller 221 controls the operation of each of the constituent elements connected to the parallel bus 220. Moreover, the RAM 232 is used as a work area of the system controller 231. The ROM 233 stores therein the boot program and the like for the system controller 231.

The console panel 234 inputs the processing to be performed by the image processing apparatus 105: for example, the kind of processing (copying, facsimile transmission, image reading, printing or the like), the number of sheets to be processed or the like. Consequently, it is possible to input image data control information. Incidentally, the content of the facsimile control unit 224 will be described later.

Subsequently, there are a job for accumulating the read image data in the memory module 222 for reuse and a job for not accumulating the read image data in the memory module 222. Now, each of the jobs will be explained below. As an example of the job for accumulating the read image data in the memory module 222, there is a method in which when a single original is copied onto a plurality of sheets, the reading unit 201 is operated only once, and then, the image data read by the reading unit 201 is accumulated in the memory module 222, and therefore, the accumulated image data is read out a plurality of times.

In contrast, as an example of the job for not accumulating the read image data in the memory module 222, in the case where a single original is copied onto only one sheet, the read image data is simply reproduced as it is, and consequently, no access is required to the memory module 222 by the image memory access controller 221.

First of all, in the case where the memory module 222 is not used, the data transferred from the image processor 204 to the image data controller 203 is returned again to the image processor 204 from the image data controller 203. The image processor 204 performs image quality processing for converting luminance data obtained by the CCD in the sensor board unit 202 into an area gradation.

The image data after the image quality processing is transferred from the image processor 204 to the video data controller 205. The signal, which has been converted into the area gradation, is subjected to post-processing relating to dot arrangement and pulse control for reproducing dots, and thereafter, a reproduced image is formed on a transfer sheet in the image forming unit 206.

Subsequently, a description will be given of a flow of the image data in the case where additional processing, for example, a turn in an image direction, synthesis of images or the like is performed in reading the image accumulated in the memory module 222. The image data transferred to the image data controller 203 from the image processor 204 is transmitted to the image memory access controller 221 from the image data controller 203 via the parallel bus 220.

The image memory access controller 221 performs access control of the image data by the memory module 222, development of printing data in an outside personal computer (PC) 223, and compression/decompression of the image data for effective use of the memory module 222 based on the control of the system controller 231.

The image data transmitted to the image memory access controller 221 is accumulated in the memory module 222 after data compression, and the accumulated image data is read, as required. The read image data is decompressed to the original image data, and then, is returned to the image data controller 203 from the image memory access controller 221 via the parallel bus 220.

After the transmission from the image data controller 203 to the image processor 204, the image quality processing and the pulse control in the video data controller 205 are performed, thereby forming a reproduced image on a transfer sheet in the image forming unit 206.

In the flow of the image data, the function of the digital combined machine can be served under the bus control in the parallel bus 220 and the image data controller 203. In order to exhibit the facsimile transmission function, the read image data is subjected to the image processing in the image processor 204, and then, is transferred to the facsimile control unit 224 via the image data controller 203 and the parallel bus 220. The facsimile control unit 224 performs data conversion with respect to a communication network, and then, transmits the data as facsimile data to a public network (PN) 225.

In the meantime, as to the received facsimile data, network data from the public network (PN) 225 is converted into image data in the facsimile control unit 224, and then, is transferred to the image processor 204 via the parallel bus 220 and the image data controller 203. In this case, dot rearrangement and the pulse control are performed in the video data controller 205, and thereafter, a reproduced image is formed on a transfer sheet in the image forming unit 206.

In the situation in which the plurality of jobs, for example, the copying function, the facsimile transmitting/receiving function, the printer outputting function and the like are operated in parallel, the assignment of the using priority of the image forming unit 206 and parallel bus 220 to the jobs is controlled by the system controller 231 and the process controller 211.

The process controller 211 controls the flow of the image data; in contrast, the system controller 231 controls the entire system and manages the booting of resources. Furthermore, the functions of the digital combined machine are selectively input in the console panel (the operating unit) 234, and thus, the processing content of the copying function, the facsimile function or the like is set.

The system controller 231 and the process controller 211 communicate with each other via the parallel bus 220, the image data controller 203 and the serial bus 210. Specifically, the system controller 231 and the process controller 211 communicate with each other by converting a data format for a data interface between the parallel bus 220 and the serial bus 210 inside the image data controller 203.

Figure 3:
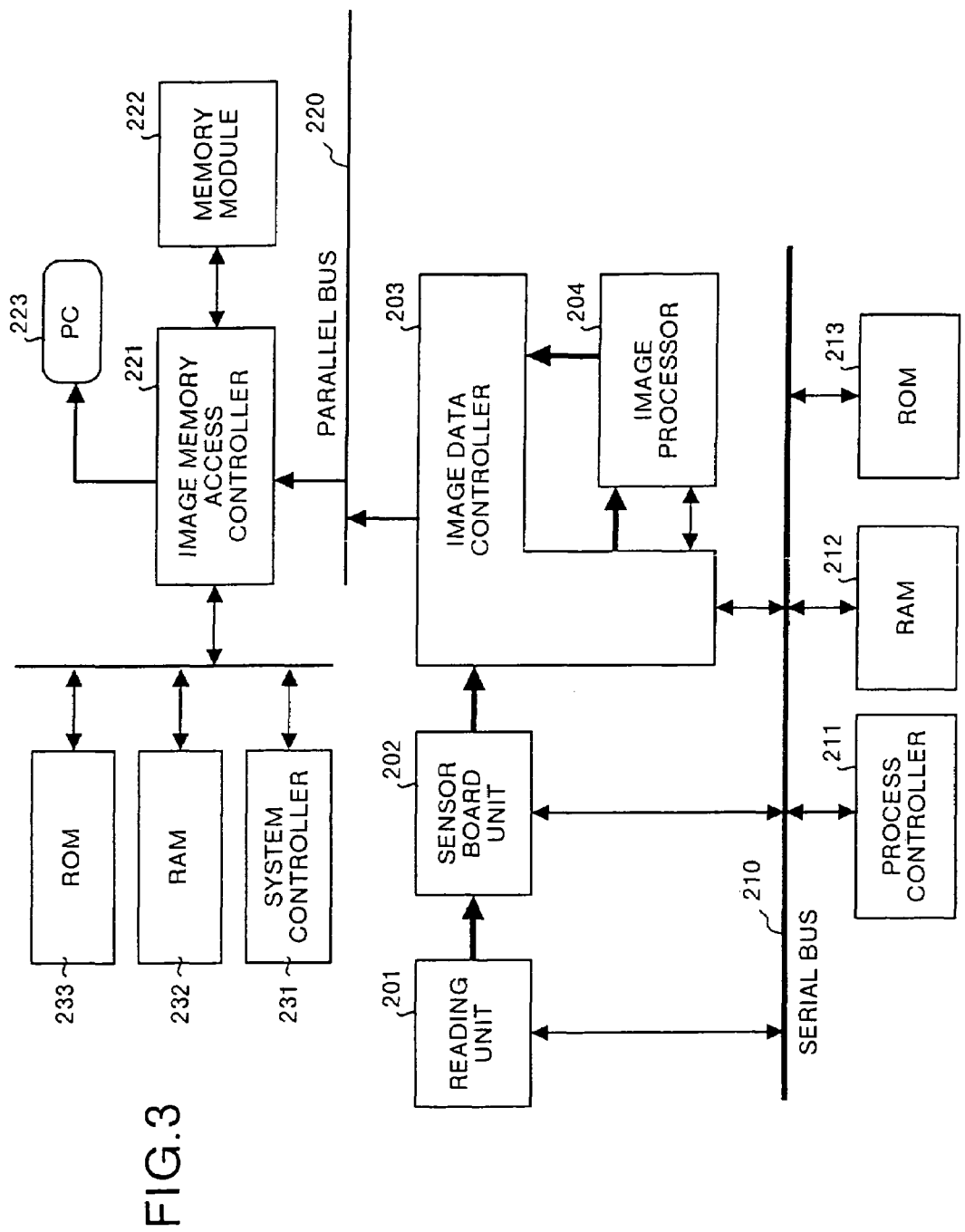
FIG. 3 is a block diagram illustrating another example of the hardware configuration of the image processing apparatus in the present embodiment.

Next, hardware configuration when the image processing apparatus 105 in the present embodiment is to be utilized as a scanner will be explained here. FIG. 3 is a block diagram illustrating another example of the hardware configuration of the image processor in the present embodiment, wherein the same constituent elements as those of the hardware configuration in the block diagram illustrated in FIG. 2 are designated by the same reference numerals, and therefore, the explanation will be omitted.

A greatest difference in the hardware system configuration between the discrete scanner illustrated in FIG. 3 and the digital combined machine illustrated in FIG. 2 resides in the presence of the image forming unit 206. Since the discrete scanner does not need any image forming unit, there is not provided any video data controller 205 accordingly.

Image data read in a reading unit 201 is digitally converted in a sensor board unit 202, and then, is transferred to an image processor 204 via an image data controller 203. Thereafter, the image processor 204 performs image processing required for the discrete scanner.

The main image processing required for the discrete scanner is correction of deterioration of the read image, and further, may include gradation processing suitable for a display using a screen. Consequently, the image processing is different from the image quality processing directed to a transfer sheet.

If the image processor 204 is constituted of a programmable arithmetic processor, it is enough to set only procedures required for the image quality processing to the transfer sheet and the gradation processing to the screen, and therefore, it is unnecessary to possess both the procedures of the image quality processing and the procedures of the gradation processing all the time.

The image data after the gradation processing is transferred to the image data controller 203, and then, is transmitted to the image memory access controller 221 via the parallel bus 220. Here, a memory module 222 is used as a buffer memory. The image data is transferred to a driver attached to a PC 223, thereby serving the function of the scanner.

In the same manner as the digital combined machine, a system controller 231 and a process controller 211 manage the image data and resources of the system.

Figure 4:
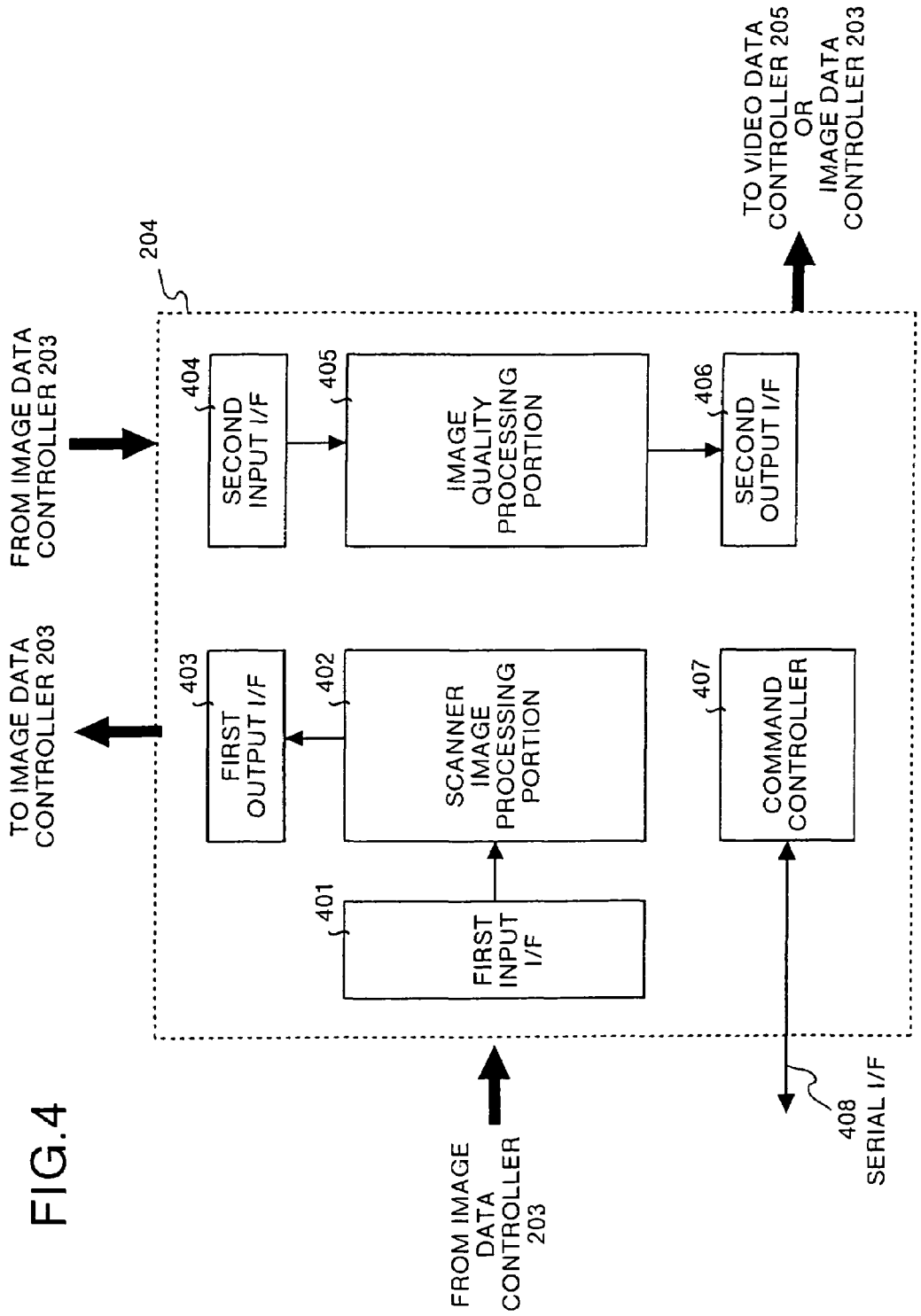
FIG. 4 is a block diagram illustrating the outline of processing in an image processor in the image processing apparatus in the present embodiment.

Next, the outline of the processing in the image processor 204 constituting the image processing unit 103 will be explained here. FIG. 4 is a block diagram illustrating the outline of the processing in the image processor 204 in the image processing apparatus in the present embodiment.

As shown in FIG. 4, the image processor 204 includes a first input interface (I/F) 401, a scanner image processing portion 402, a first output I/F 403, a second input I/F 404, an image quality processing portion 405 and a second output I/F 406.

In the above-mentioned configuration, read image data is transmitted from the first input I/F 401 to the scanner image processing portion 402 in the image processor 204 via the sensor board unit 202 and the image data controller 203.

The scanner image processing portion 402 is directed to correct the deterioration of the read image data: specifically, shading correction, scanner γ correction, MTF correction and the like. Furthermore, the scanner image processing portion 402 can perform scaling processing of enlargement/reduction, although not the correction processing in the strict sense. Upon completion of the correction processing of the read image data, the image data is transferred to the image data controller 203 via the first output interface (I/F) 403.

In outputting the image data to a transfer sheet, the image data from the image data controller 203 is received in the second input I/F 404, and then, is subjected to the area gradation processing in the image quality processing portion 405. The image data after the image quality processing is output to the video data controller 205 or the image data controller 203 via the second output I/F 406.

The area gradation processing in the image quality processing portion 405 includes mainly area approximation of gradation information such as density converting processing, dither processing and error diffusing processing. Once the image data processed in the scanner image processing portion 402 is accumulated in the memory module 222, various reproduced images can be confirmed by changing the image quality processing in the image quality processing portion 405.

For example, the tone of the reproduced image can be easily varied by assigning (varying) the density of the reproduced image or varying the number of lines of dither matrices. At this time, it is unnecessary to read the image from the reading unit 201 every time the processing is varied. The same image data can be speedily subjected to different processing any time by reading the accumulated image data from the memory module 222.

In the case of the discrete scanner, the image data is subjected to the scanner image processing and the gradation processing in combination, to be thus output to the image data controller 203. The processing contents can be varied in a programmable manner. Switching of the processing, changing of the procedures and the like are managed by a command controller 407 via a serial I/F 408. The image processor 204 is connected to the process controller 211 and the ROM 213 storing the processing information therein via the serial I/F 408.

Figure 5:
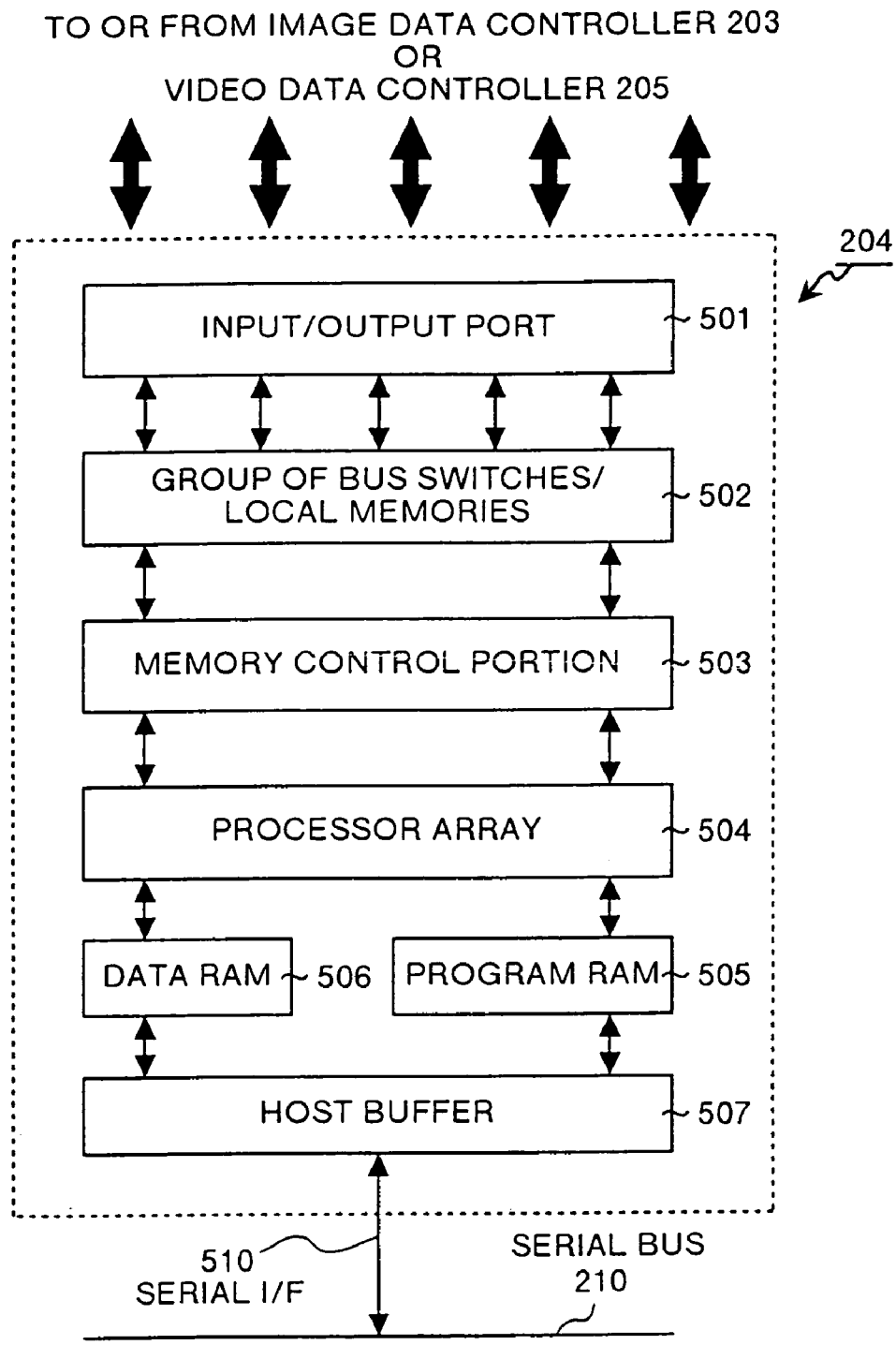
FIG. 5 is a block diagram illustrating the inside configuration of the image processor of the image processing apparatus in the present embodiment.

An internal configuration of the image processor 204 will now be explained. FIG. 5 is a block diagram illustrating the inside configuration of the image processor 204 of the image processing apparatus in the present embodiment. As shown in FIG. 5, the image processor 204 is provided with a plurality of input/output ports 501 concerned in data input/output to/from the outside, each of which can arbitrarily set the input and output of the data.

Furthermore, the image processor 204 is provided therein with a group 502 of bus switches/local memories, and a memory control portion 503 for controlling a memory region to be used and a path of a data bus. Input data and data to be output are stored in a buffer memory, to which the group 502 of bus switches/local memories is assigned, and thus, are restricted from an interface with the outside.

A processor array 504 performs various processing with respect to the image data stored in the group 502 of bus switches/local memories. An output result, i.e., the processed image data, is stored again in the group 502 of bus switches/local memories. The procedures and parameters for the processing in the processor, i.e., the processing information is transmitted or received between a program RAM 505 and a data RAM 506.

The contents (the processing information) of the program RAM 505 and data RAM 506 are loaded down (transmitted) to a host buffer 507 from the ROM 213 through a serial I/F 510 by the process controller 211. Incidentally, the serial I/F 510 is the same as the serial I/F 408 illustrated in FIG. 4. Moreover, the process controller 211 reads the content of the data RAM 506, and monitors the flow of the processing or the like in the processor array 504.

The state in which the content of the processing is varied or the processing mode required in the system is varied is coped with by updating the contents of the program RAM 505 and data RAM 506 which are directly referred to by the processor array 504.

Here, assuming that in a copying operation by the image processing apparatus 105 according to the present invention, the image data read by the reading unit 201 is output as a reproduced image (a printed image of an original to be copied) through "the image data controller 203," "the image processor 204," "the image data controller 203," "the image processor 204," "the video data controller 205" and "the image forming unit 206".

Figure 6:
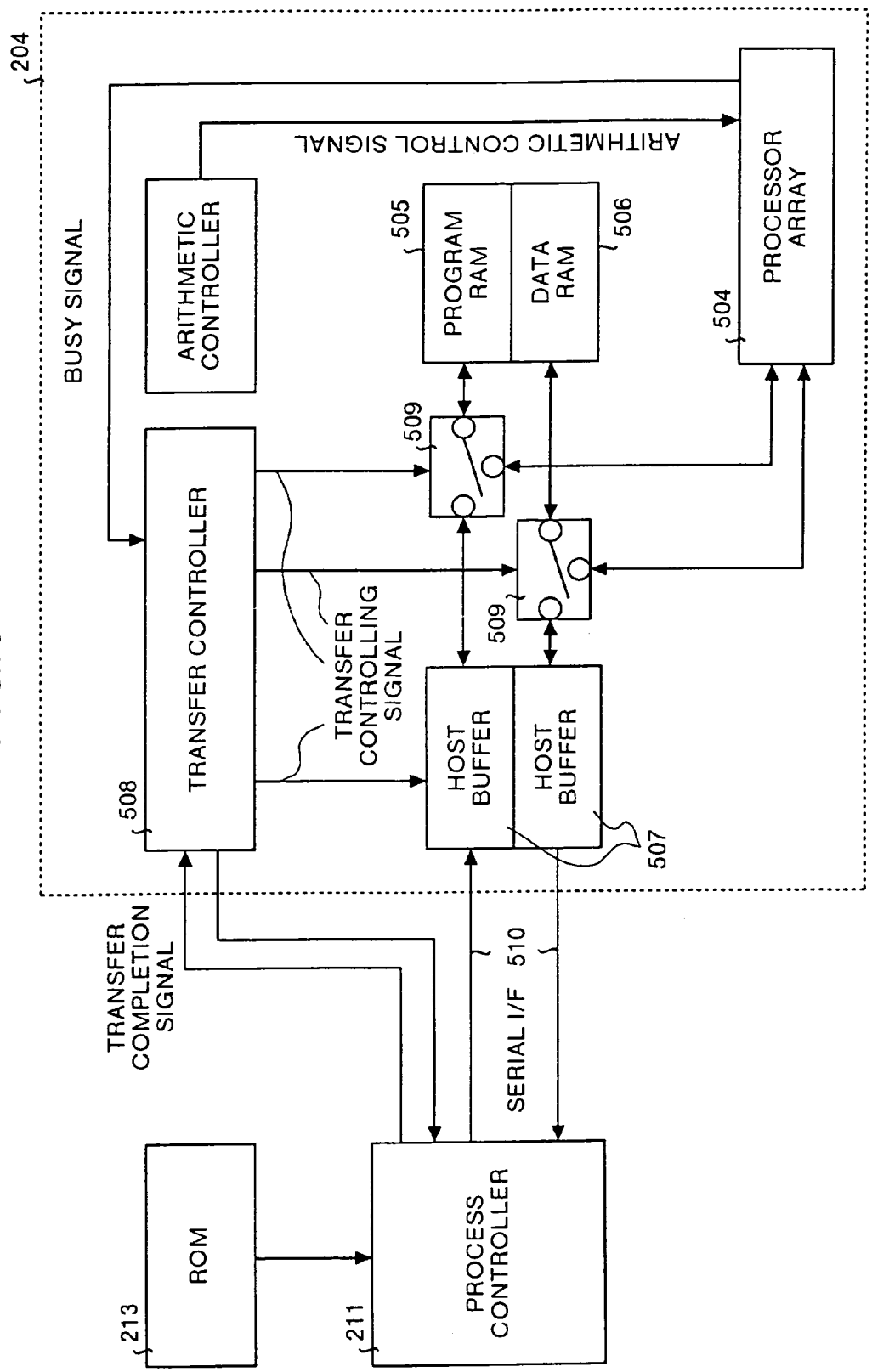
FIG. 6 is a block diagram illustrating the correlation among the image processor, a process controller and a ROM in the image processing apparatus in the present embodiment.
Figure 7:
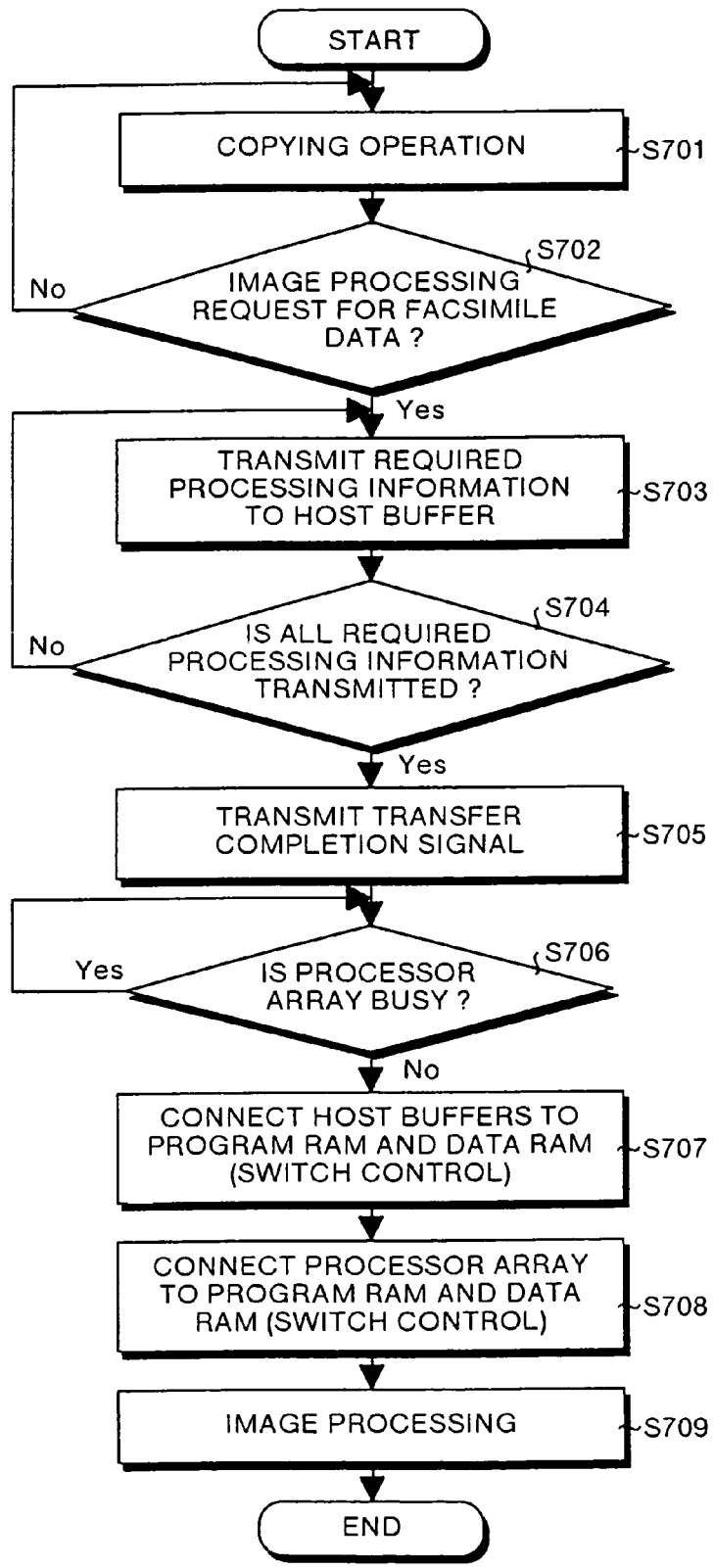
FIG. 7 is a flowchart illustrating the outline of image processing in the case where reception is requested in a facsimile during a copying operation in the image processing apparatus in the present embodiment.

Explanation will be made on a flow of the processing in the case where reception is requested in the facsimile during the copying operation. FIG. 6 is a block diagram illustrating the correlation among the image processor 204, the process controller 211 and the ROM 213. FIG. 7 is a flowchart illustrating the outline of the image processing in the case where the reception is requested in the facsimile during the copying operation.

The copying operation is performed under the control of the process controller 211 (step S701). During the copying operation, the system controller 231 judges whether or not there is an image processing request for facsimile data (step S702). If there is no image processing request for the facsimile data (No in step S702), the image processing apparatus 105 continues the copying operation as it is under the control of the process controller 211.

In contrast, if there is an image processing request for facsimile data (Yes in step S702), the process controller 211 transmits the processing information consisting of the procedures and data required for the image processing in accordance with the facsimile reception from the ROM 213 additionally provided via the serial bus 210 to the host buffer 507 in the image processor 204 (step S703).

The process controller 211 judges whether or not all the required processing information is transmitted (step S704).

During the transmission (No in step S704), the process controller 211 continues the transmitting control. In contrast, upon completion of the transmission (Yes in step S704), the process controller 211 transmits a transfer completion signal to a transfer controller 508 in the image processor 204 (step S705).

In transferring the required processing information, the process controller 211 may control to preferentially transfer the processing information as a unit. Such unitary transferring achieves smoother and faster image processing, i.e., more efficient image processing.

Upon inputting the transfer completion signal, the transfer controller 508 monitors and detects a busy signal indicating that the processor array 504 is processing the image, thereby judging whether or not the processor array 504 is busy (step S706). If there occurs no busy signal (No in step S706), the processor array 504 does not perform any image processing. In other words, during the period when the transfer controller 508 does not input any busy signal, the processor array 504 does not refer to the program RAM 505 and data RAM 506 storing therein the processing information for use in the image processing.

The transfer controller 508 controls switches 509 to connect the host buffers 507 to the program RAM 505 and the data RAM 506, respectively, at a timing (a cycle time) when no busy signal is sent (No in step S706), and thus, transmits the processing information, which is stored in the host buffers 507 and is referred to during the image processing, to the program RAM 505 and the data RAM 506 (step S707).

In transmitting the processing information, the transfer controller 508 controls to complete the transmission of the processing information until the busy signal from the processor array 504 becomes active, that is, until a next image processing operation is started. For example, the transfer controller 508 performs fast transfer by incrementing a system clock at the section concerned in the transmission.

Upon completion of the transmission of the processing information, the transfer controller 508 controls the switches 509 to connect the processor array 504 again to the program RAM 505 and the data RAM 506 (step S708). The processor array 504 performs next image processing by referring to the processing information, which is stored and updated in the program RAM 505 and data RAM 506, at the timing (the cycle time) when the image processing is performed again (step S709).

That is, in order to cope with a variety of kinds of image processing by the image processing apparatus 105, the programmable image processing section consisting of the processor array 504, the program RAM 505 and the data RAM 506 is configured in the image processor 204, so that the processing information required for the image processing is transferred to the program RAM 505 and the data RAM 506 under the control of the process controller 211 responsible for the process control of the entire apparatus.

At this time, in the situation in which a load of the process controller 211 is large, control performance of the transmission/reception of the processing information is degraded to delay the image processing in the image processor 204, thereby making the efficient image processing impossible. In order to avoid such a situation, the processing information is previously transferred to the host buffers 507, and subsequently, the processor array 504 transmits the processing information to the program RAM 505 and the data RAM 506, which are directly referred to during the image processing, by using an inoperative period of the processor array 504.

The facsimile reception operation after the copying operation with the transmitting control of the processing information in the above-described manner achieves the plurality of kinds of image processing in a seamless fashion; and further, if the jobs are assigned, the plurality of kinds of image processing can be performed in parallel.

The host buffers 507 can store therein more kinds of processing information than those stored in the program RAM 505 and the data RAM 506 and referred to during the image processing. Since there is generally a little processing information referred to directly by the processor array 504 and stored in the program RAM 505 and the data RAM 506, smooth and efficient image processing can be achieved by previously storing several kinds of processing information in the host buffers 507 in consideration of the transferring efficiency of the processing information.

Next, a description will be given of a timing when the busy signal sent from the processor array 504 becomes inactive. Although the image processing is performed by sequentially processing the image data consisting of a plurality of raster-scanned lines, the image data is once stored in the group 502 of bus switches/local memories inside the image processor 204, as descried above.

The processor array 504 performs the image processing faster than an input/output operation by a normal memory in order to perform the processing at as a high speed as possible. Consequently, there inevitably exists a period when the processor array 504 need not perform any image processing until a next line is stored in the local memory and then the processing is started after completion of the processing of one line. During this period, the busy signal can be made inactive.

Figure 8:
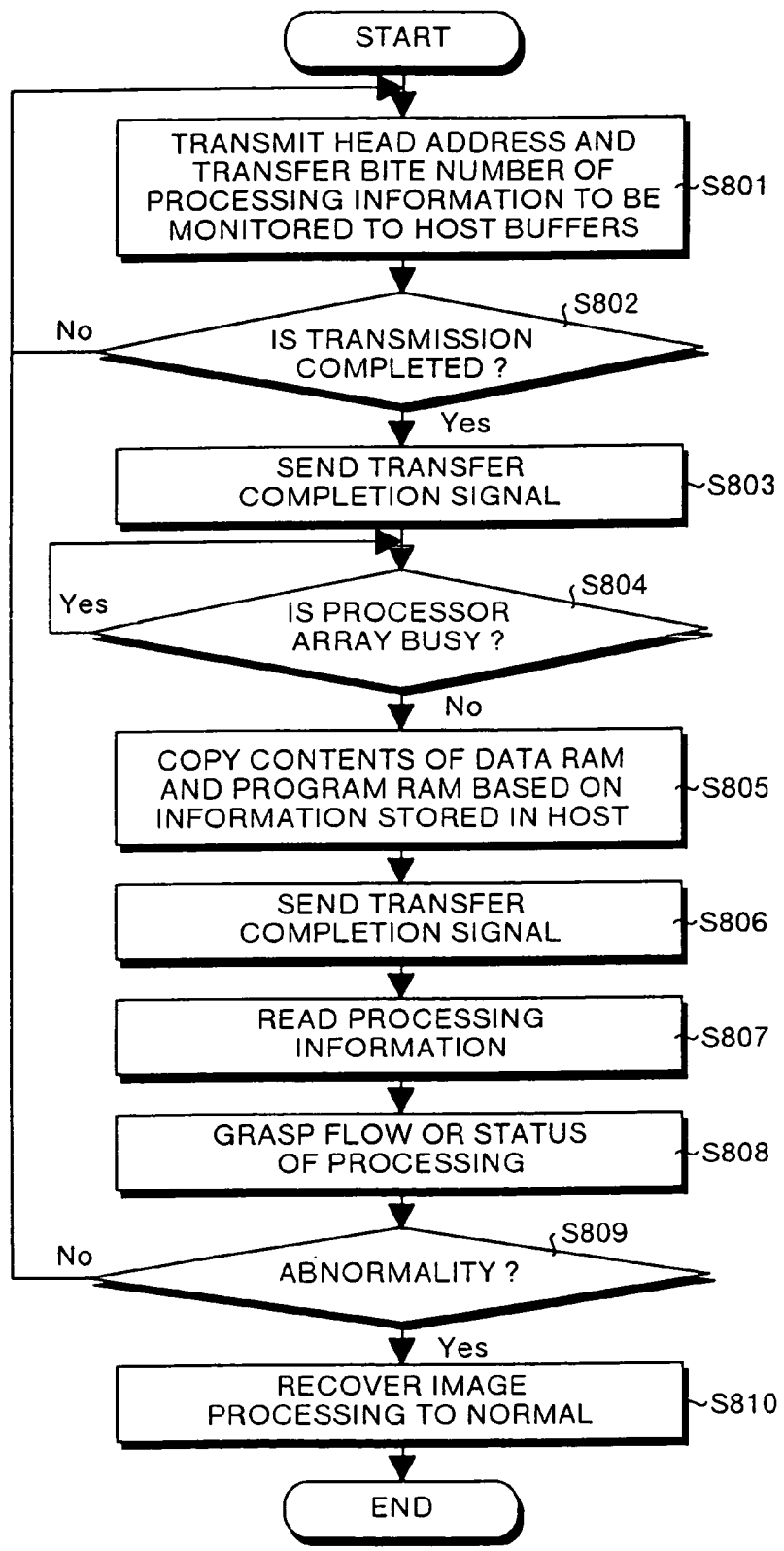
FIG. 8 is a flowchart illustrating the outline of monitoring the image processing in the image processing apparatus in the present embodiment.

Subsequently, explanation will be made on monitoring the image processing. In the case where the plurality of kinds of image processing are performed, the image processing apparatus 105 need monitor the status of the current image processing through the program RAM 505 and the data RAM 506 in order to prevent any conflict between the plurality of kinds of image processing or to cope with an accident in which the image processing is interrupted due to a factor other than the image processing such as paper jamming. FIG. 8 is a flowchart illustrating the outline of monitoring the image processing.

The process controller 211 transmits a head address of the processing information to be monitored in the program RAM 505 and the data RAM 506 and the transfer bite number indicating how much the processing information is extracted from the address to the host buffers 507 via the serial I/F 510 (step S801).

The process controller 211 judges whether or not the transmission of the head address and transfer bite number is completed (step S802). If the transmission has not been completed yet (No in step S802), the process controller 211 continues the transmission control; in contrast, if the transmission has been completed already (Yes in step S802), the process controller 211 sends a transfer completion signal (step S803) to the transfer controller 508.

The transfer controller 508 receives the transfer completion signal, and further, receives the busy signal from the processor array 504, and then, judges whether or not the processor array 504 is processing the image (namely, whether or not the processor array 504 is active) (step S804) The transfer controller 508 controls the switches 509 during a period when the busy signal is inactive, that is, when the processor array 504 does not refer to the program RAM 505 and the data RAM 506 (No in step S804), and thereafter, data corresponding to the head address and transfer bite number written in the host buffers 507 is copied at a high speed from the program RAM 505 and the data RAM 506 to the host buffers 507 in consideration of the head address and the transfer bite number (step S805).

At this time, if the process controller 211 controls to preferentially read the content of the data RAM 506 as a unit, the following image processing can be performed speedily and smoothly.

Upon completion of the copying operation, the transfer controller 508 sends the transfer completion signal to the process controller 211, thereby notifying that the monitored processing information has been copied to the host buffers 507 (step S806). Thereafter, the process controller 211 reads the requested processing information from the host buffers 507 (step S807), and consequently, based on the read processing information, the system controller 231 grasps the flow or status of the processing (step S808).

The system controller 231 judges whether or not there is an abnormality in the image processing (step S809). If there is no abnormality (No in step S809), the control routine returns to step S801, in which the processing status is monitored. In contrast, if there is an abnormality (Yes in step S809), the image processing is recovered to a normal state under the control of the system controller 231 (step S810).

Here, although it is judged whether or not there is an abnormality in step S809, it may be judged whether or not there is, for example, an interrupt request for another image processing, thereby controlling to switch to image processing of image data to be preferentially processed.

Figure 9:
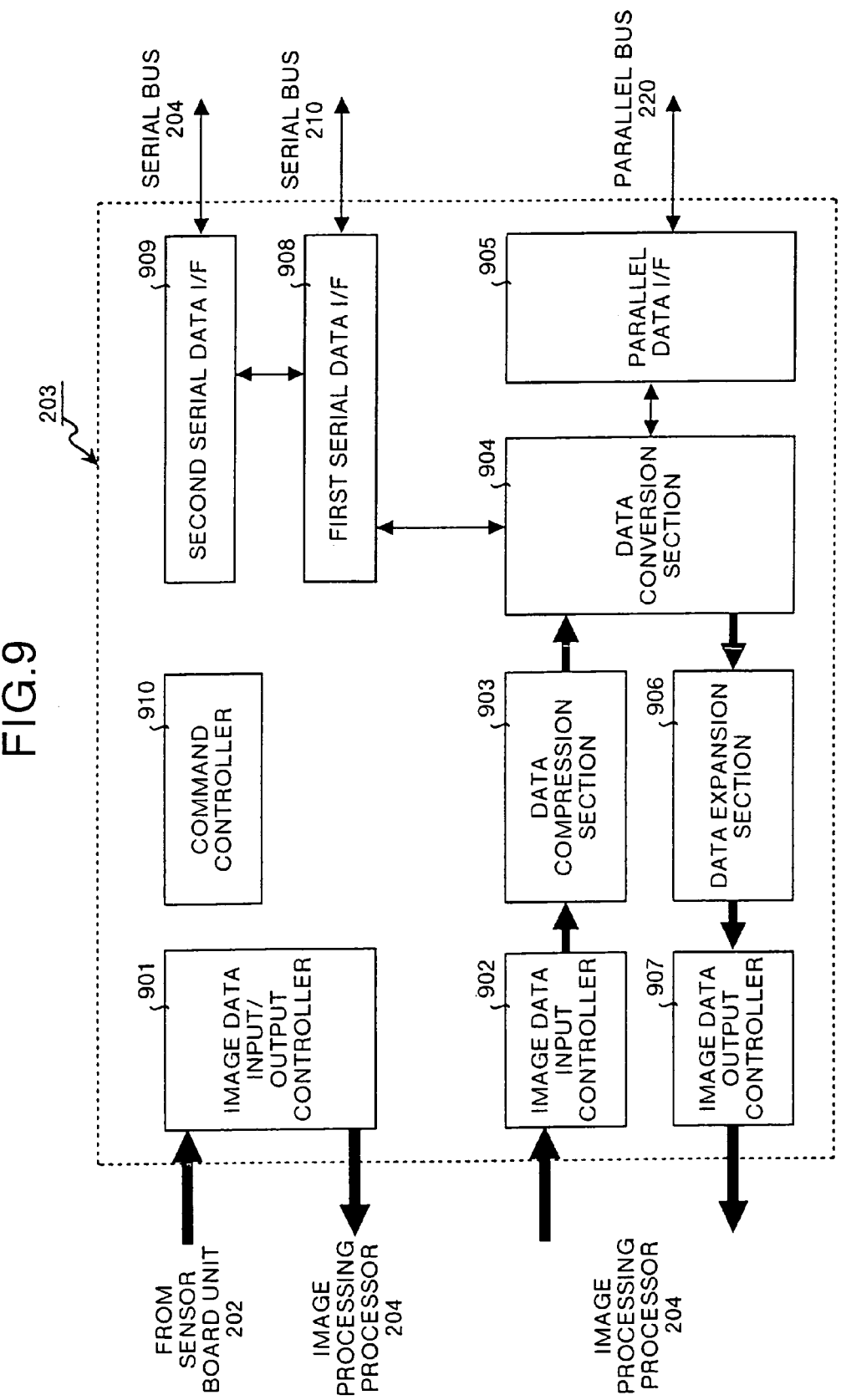
FIG. 9 is a block diagram illustrating the outline of the processing in an image data controller in the image processing apparatus in the present embodiment.

Next, outline of the processing in the image data controller 203 constituting the image data control unit 100 will be explained here. FIG. 9 is a block diagram illustrating the outline of the processing in the image data controller 203 in the image processing apparatus in the present embodiment.

As shown in FIG. 9, an image data input/output controller 901 inputs (receives) the image data from the sensor board unit 202, and then, outputs (transmits) the image data to the image processor 204. That is, the image data input/output controller 901 is a constituent element for connecting the image reading unit 101 and the image processing unit 103 (the image processor 204) to each other, or an input/output port exclusive for merely transmitting the image data read by the image reading unit 101 to the image processing unit 103.

Furthermore, an image data input controller 902 inputs (receives) the image data, which has undergone scanner image correction in the image processor 204. The input image data is subjected to data compressing processing in a data compressor 903 so as to enhance transfer efficiency in the parallel bus 220. Thereafter, the image data is sent to the parallel bus 220 through a parallel data I/F 905 via a data converter 904.

Since the image data input from the parallel bus 220 via the parallel data I/F 905 is compressed for the purpose of the bus transfer, the image data is sent to a data decompressor 906 via the data converter 904, to be thus subjected to data decompressing processing. The decompressed image data is transferred to the image processor 204 in an image data output controller 907.

Moreover, the image data controller 203 is also equipped with the function of converting parallel data into serial data, and vice versa. The system controller 231 transfers the data to the parallel bus 220; in the meantime, the process controller 211 transfers the data to the serial bus 210. Therefore, the image data controller 203 converts the data for the purpose of the communications between the two controllers 231 and 211.

Additionally, a serial data I/F unit includes a second serial data I/F 908 for transmitting or receiving the data to or from the process controller 211 via the serial bus 210 and a first serial data I/F 909 for use in transmitting or receiving the data to or from the image processor 204. Since one system is independently provided with respect to the image processor 204, it is possible to smoothen an interface with the image processor 204.

A command controller 910 controls the operations of the constituents and interfaces inside the above-described image data controller 203 in accordance with an input command.

Figure 10:
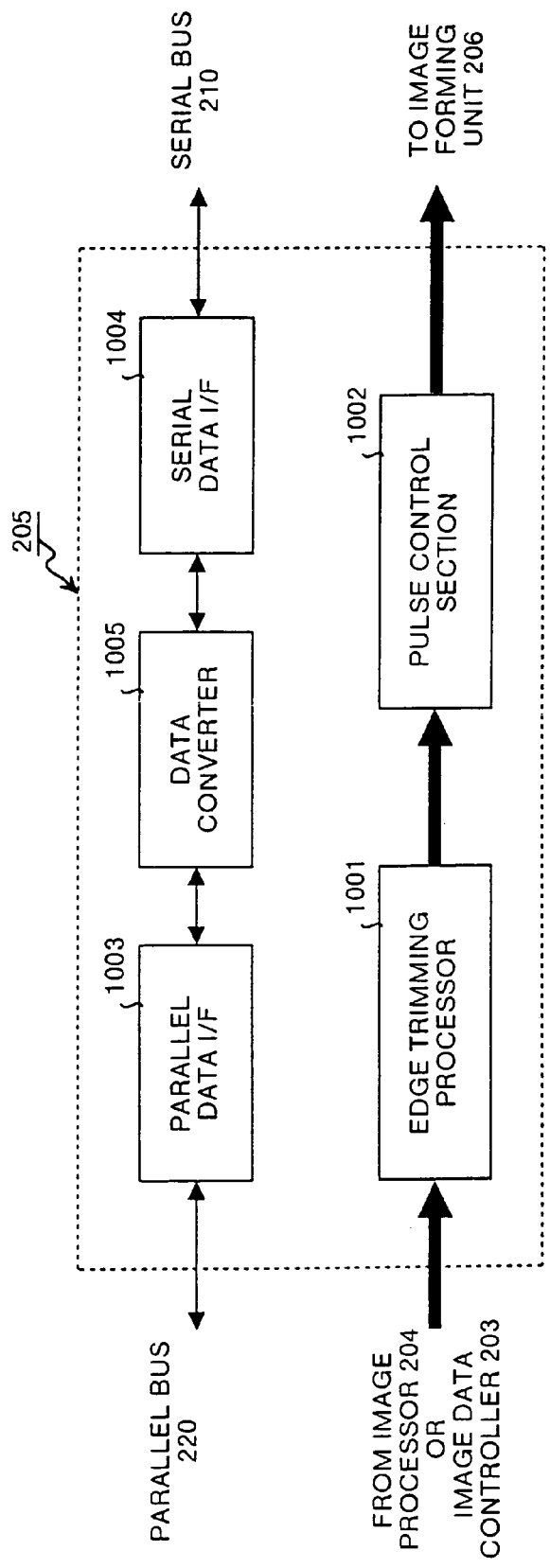
FIG. 10 is a block diagram illustrating the outline of the processing in a video data controller in the image processing apparatus in the present embodiment.

Next, outline of the processing in the video data controller 205 constituting a part of the image writing unit 104 will be explained here. FIG. 10 is a block diagram illustrating the outline of the processing in the video data controller 205 in the image processing apparatus in the present embodiment.

As shown in FIG. 10, the video data controller 205 subjects the image data to be input to additional processing depending upon the characteristics of the image forming unit 206. Namely, an edge trimming processor 1001 rearranges dots by edge trimming processing. A pulse controller 1002 controls a pulse of an image signal for the purpose of dot formation. The image data through the above-described processing is output to the image forming unit 206. Incidentally, the edge trimming processing 1001 may be performed in the image processor 204 according to the using manner.

Besides the image data conversion, since the video data controller 205 is equipped with the format converting function for parallel data and serial data, the video data controller 205 even as a discrete unit can cope with the communications between the system controller 231 and the process controller 211. That is, a parallel data I/F 1003 for transmitting or receiving the parallel data, a serial data I/F 1004 for transmitting or receiving the serial data and a data converter 1005 for mutually converting the data received by the parallel data I/F 1003 and the data received by the serial data I/F 1004. Consequently, it is possible to convert the format of the parallel data into the format of the serial data, and vice versa.

Figure 11:
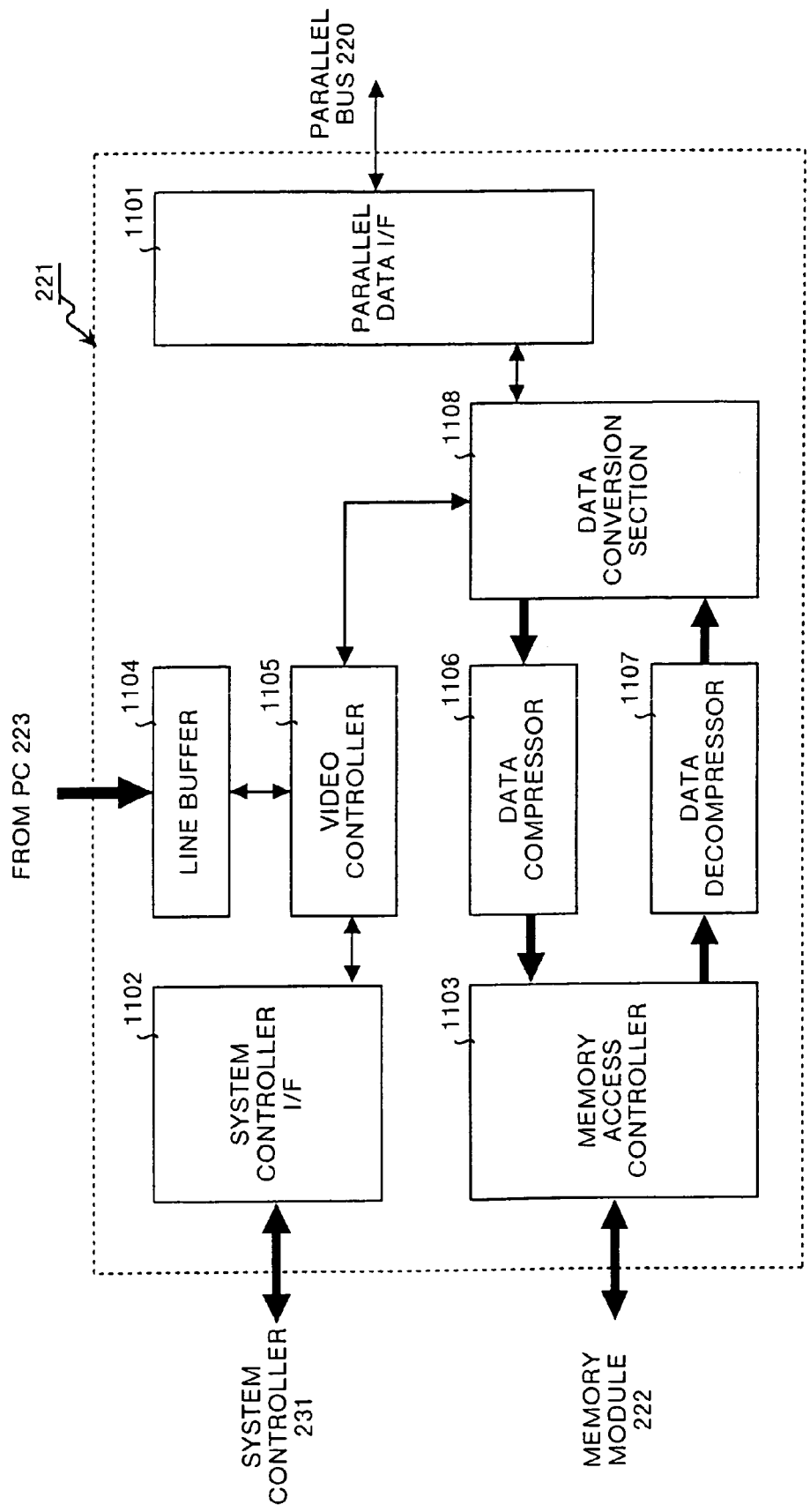
FIG. 11 is a block diagram illustrating the outline of the processing in an image memory access controller in the image processing apparatus in the present embodiment.

Next, outline of the processing in the image memory access controller 221 constituting a part of the image memory control unit 102 will be explained here. FIG. 11 is a block diagram illustrating the outline of the processing in the image memory access controller 221 in the image processing apparatus in the present embodiment.

As shown in FIG. 11, the image memory access controller 221 manages the parallel bus 220 and the interface of the image data, controls an access, i.e., storing (writing)/reading of the image data in the memory module 222, and further, controls development of code data to be input from mainly the outside PC 223 to the image data.

Therefore, the image memory access controller 221 includes a parallel data I/F 1101, a system controller I/F 1102, a memory access controller 1103, a line buffer 1104, a video controller 1105, a data compressor 1106, a data decompressor 1107 and a data converter 1108.

Here, the parallel data I/F 1101 manages an interface of the image data with the parallel bus 220. Furthermore, the memory access controller 1103 controls an access, i.e., storing (writing)/reading of the image data in the memory module 222.

As to the input code data, the data is stored in a local region in the line buffer 1104. The code data stored in the line buffer 1104 is developed to image data in the video controller 1105 in accordance with a development processing command input from the system controller 231 via the system controller I/F 1102.

The developed image data or the image data input from the parallel bus 220 via the parallel data I/F 1101 is stored in the memory module 222. In this case, the image data to be stored is selected in the data converter 1108, to be thus compressed in the data compressor 1106 in order to enhance memory using efficiency, and then, the image data is stored (written) in the memory module 222 while an address of the memory module 222 is managed in the memory access controller 1103.

The image data stored (accumulated) in the memory module 222 is read by controlling an address to be read in the memory access controller 1103. The read image data is decompressed in the data decompressor 1107. In the case where the decompressed image data is transferred to the parallel bus 220, the data is transferred via the parallel data I/F 1101.

Figure 12:
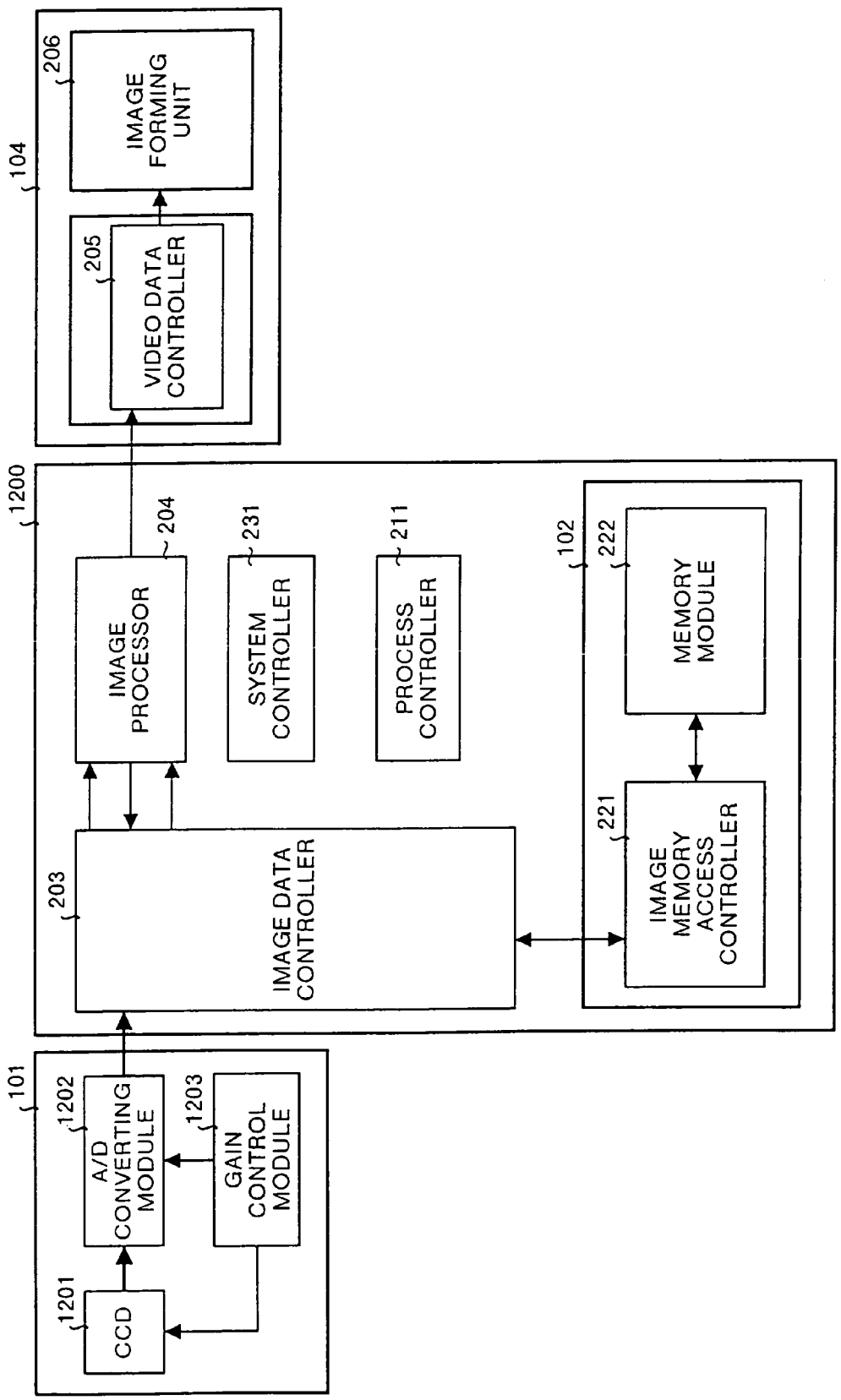
FIG. 12 is a block diagram illustrating one example of unit configuration in the case where the image processing apparatus in the present embodiment is a digital combined machine.
Figure 13:
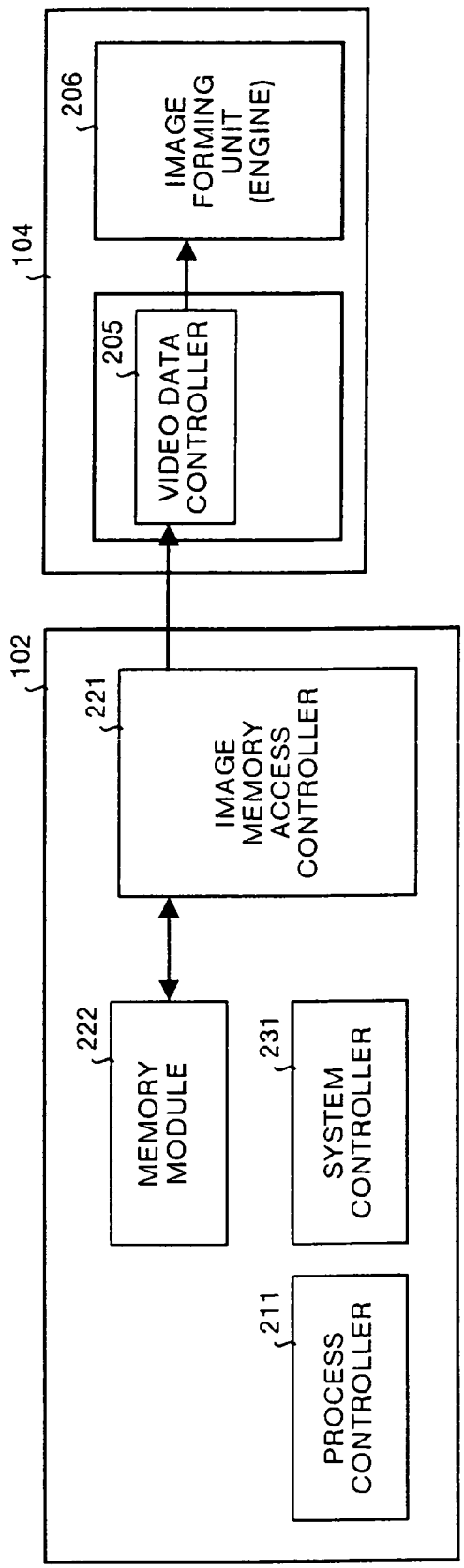
FIG. 13 is a block diagram illustrating an example of unit configuration in the case where the image processing apparatus in the present embodiment is a discrete printer.

Next, configuration of the image processing apparatus 105 will be explained here. FIG. 12 is a block diagram illustrating one example of the configuration in the case where the image processing apparatus 105 is a digital combined machine. FIG. 13 is a block diagram illustrating one example of the configuration in the case where the image processing apparatus 105 is a discrete printer.

As shown in FIG. 12, in the case of the digital combined machine, the image processing apparatus comprises three units. That is, the image processing apparatus comprises the image reading unit 101, an image engine control unit 1200 and the image writing unit 104, each of the three units being managed on an independent PCB substrate.

The image reading unit 101 consists of a CCD 1201, an A/D converting module 1202 and a gain control module 1203, for converting optical image information, which has been optically read, into a digital image signal.

The image engine control unit 1200 consists of mainly the system controller 231, the process controller 211 and the memory module 222 contained inside the image memory control unit 102, wherein the image processor 204, the image memory access controller 221 and the image data controller 203 in charge of the bus control are managed as a single unit.

Furthermore, the image writing unit 104 consists of mainly the video data controller 205, and includes the image forming unit 206.

According to the above-described configuration, in the case where the specifications and performance of the image reading unit 101 are modified, it is sufficient that only the image reading unit 101 is modified in the system of the digital combined machine, thereby making it unnecessary to modify the other units since the data interfaces are held. Moreover, in the case where the image forming unit (engine) 206 is modified, the system can be reconstructed by modifying only the image writing unit 104.

In this manner, since the units dependent on the input/output devices construct the system with the independent configurations, the system can be graded up by only replacing the minimum unit as long as the data interfaces are held.

In a discrete printer illustrated in FIG. 13, in the case of use of the same image forming unit (engine) 206 as that in the digital combined machine, the discrete printer can share the image writing unit 104 with the digital combined machine.

In the case where the image processing apparatus 105 is used as the discrete printer, it is unnecessary to provide any image reading unit 101, thereby removing the image reading unit 101 from the system configuration of the digital combined machine. Although the image engine control unit 1200 may serve its own function even if it is provided commonly with the digital combined machine, the image engine control unit 1200 possibly exceeds the specifications in such a case. According to the using mode, it is possible to make the image processor 204 unnecessary so as to configure a controller suitable for the system with another substrate, thus optimizing a cost.

In the configuration of the image engine control unit 1200 illustrated in FIG. 12, the respective modules (the constituents) of the image processor 204, image data controller 203 and image memory access controller 221 are independent of each other. Consequently, the transfer from the image engine control unit 1200 to the controller signifies the removal of an unnecessary module, and therefore, a common module is used for general-purpose use. In this manner, the similar function is fulfilled by using the common module without independently configuring the module for the image engine control and the module for the controller.

Figures 14, 15:
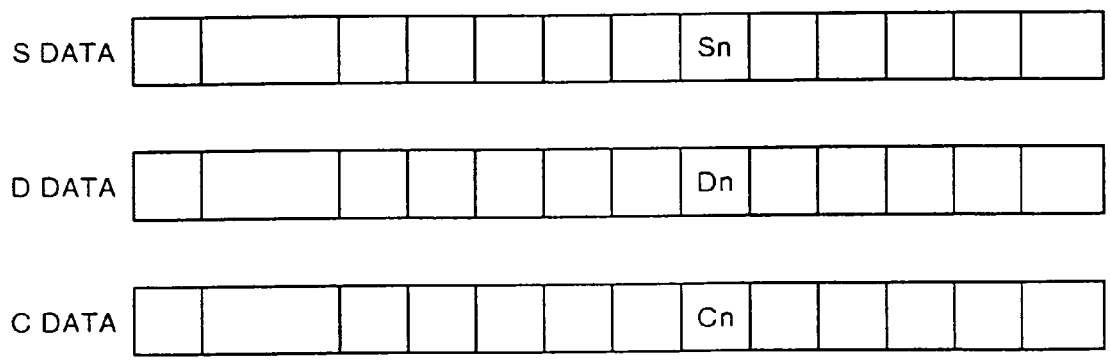
FIG. 14 is a chart illustrating the outline of a scanner (one example of a space filter) in the image processing apparatus in the present embodiment.
FIG. 15 is a chart illustrating the outline of shading correction in the image processing apparatus in the present embodiment.

Next, content of the image processing by the image processing apparatus 105 in the present embodiment will be explained here. FIG. 14 is for explaining the outline of the scanner (one example of a space filter) in the image processing apparatus 105 in the present embodiment. An MTF correcting function is fulfilled by the configuration of the space filter.

In FIG. 14, in the case where filter coefficients A to Y are allocated in a two-dimensional space filter, the input image data undergoes filter processing by subjecting all of the images to the same arithmetic processing. For example, if space filter processing is performed centering on input image data (i-row, j-column), the arithmetic processing is performed with a coefficient corresponding to the image in the i-row and j-column. Specifically, a pixel at (i, j) is subjected to the arithmetic processing with a coefficient M; and another pixel at (i, j+1) is subjected to the arithmetic processing with a coefficient N. The calculation result inside a filter matrix is output as the processing result of the target pixel at (i, j).

In the case where a target pixel is located at (i, j+1) the pixel at (i, j+1) is subjected to the arithmetic processing with the coefficient M; and a pixel at (i, j+2) is subjected to the arithmetic processing with the coefficient N. The calculation result inside the filter matrix is output as the processing result of the target pixel at (i, j+1).

In the above-described processing, the input image data are different; in contrast, the parameters for the processing are common. In this space filter processing, the coefficients A to Y are not fixed, and they may be arbitrarily changed according to the characteristics of the input image or a desired image quality. If no coefficient can be changed, the flexibility of the image processing function may not be secured.

The coefficient is downloaded from the ROM 213 under the control of the process controller 211. The image processor 204 can cope with the modification of the system by changing the content of the data to be downloaded even if the configuration of the reading unit is modified and the characteristics of degradation of the read image are varied.

Figure 16:
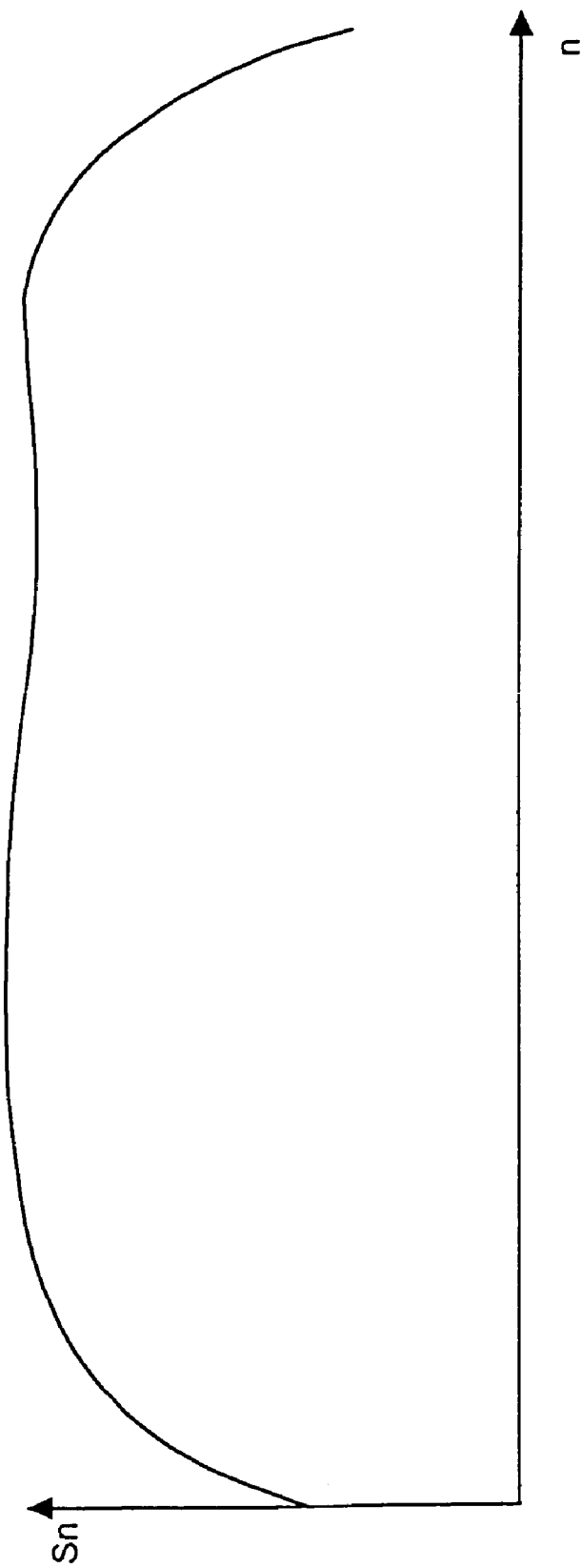
FIG. 16 is a graph illustrating the outline of shading data in the image processing apparatus in the present embodiment.

FIG. 15 is for explaining the outline of shading correction by the image processing apparatus in the present embodiment. FIG. 16 is a graph illustrating the outline of shading data in the image processing apparatus in the present embodiment. The shading correction is directed to correct non-uniformity of the characteristics of reflection light based on the luminance distribution of an illuminating system. That is, a reference white plate having a uniform density is read prior to reading the original, thereby producing reference data for the shading correction. Based on the shading data, the reflection distribution dependent upon an image reading position of the read image is normalized.

As shown in FIG. 16, the shading data is different in reflection distribution depending upon an original reading position n. The white plate having a uniform density is darkly read at the end of the original reading position. Reference character Sn designates a white plate reading signal level at the reading position n, wherein it is found that the white plate is more brightly read at greater Sn.

The shading correction is directed to correct variations of light intensity distribution of a lamp by subjecting each of the read image data to the same processing with respect to the data dependent on the position. S data illustrated in FIG. 15 is shading data produced by reading the white plate illustrated in FIG. 16. Furthermore, D data illustrated in FIG. 15 is read image data on each of reading lines. Here, reference character n designates a reading position.

C data is data after the D data is subjected to the shading processing, and is normalized as follows:

$$Cn = A \times (Dn/Sn)$$

where A denotes a normalizing coefficient.

In the image processor 204, the S data is stored in the data RAM 506, and then, the input D data is subjected to correcting calculation between Dn and Sn.

Figure 17:
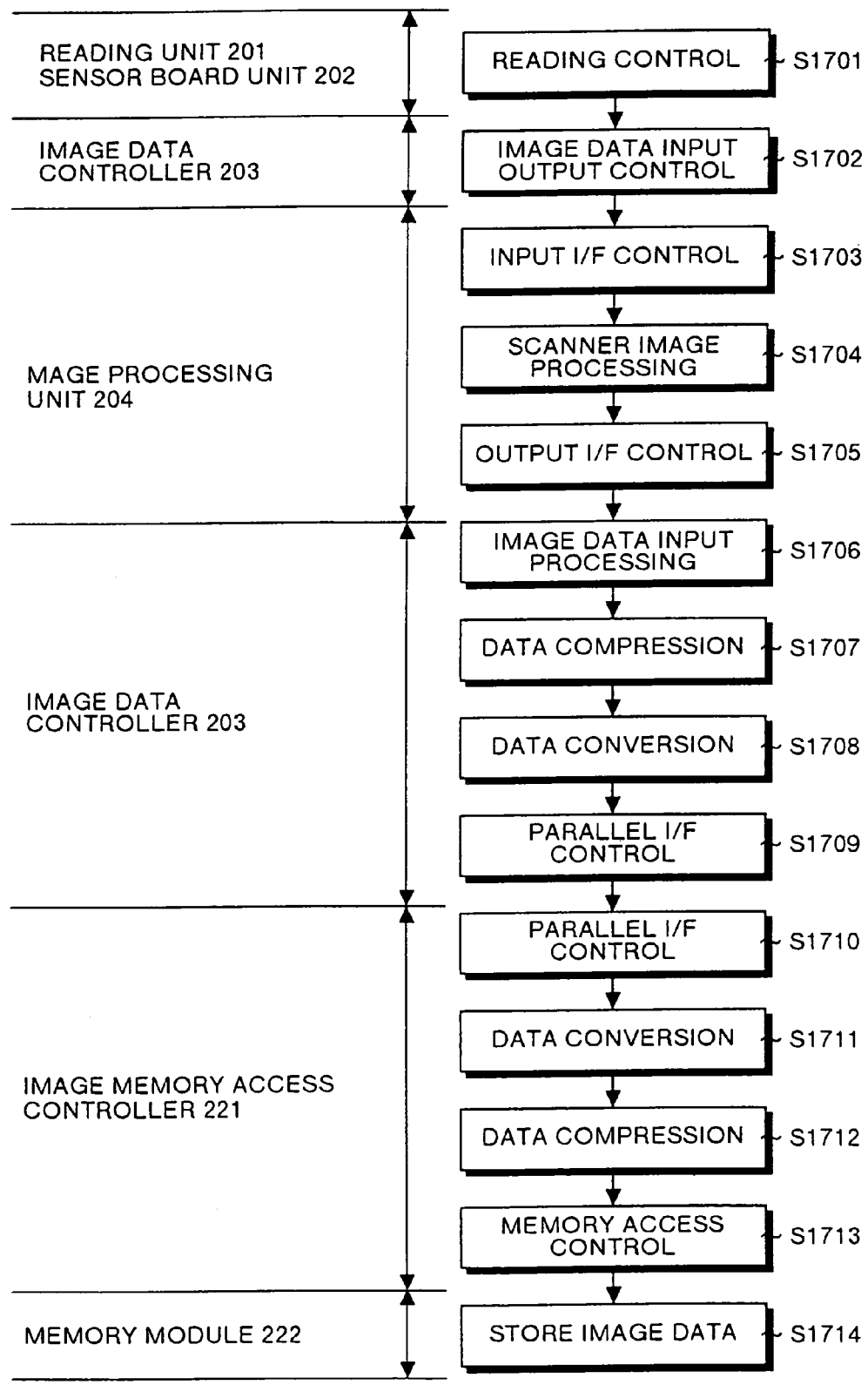
FIG. 17 is a flowchart illustrating a data flow of the image processing apparatus serving as the digital combined machine in which the processing of accumulating images in a memory module in the present embodiment is performed.
Figure 18:
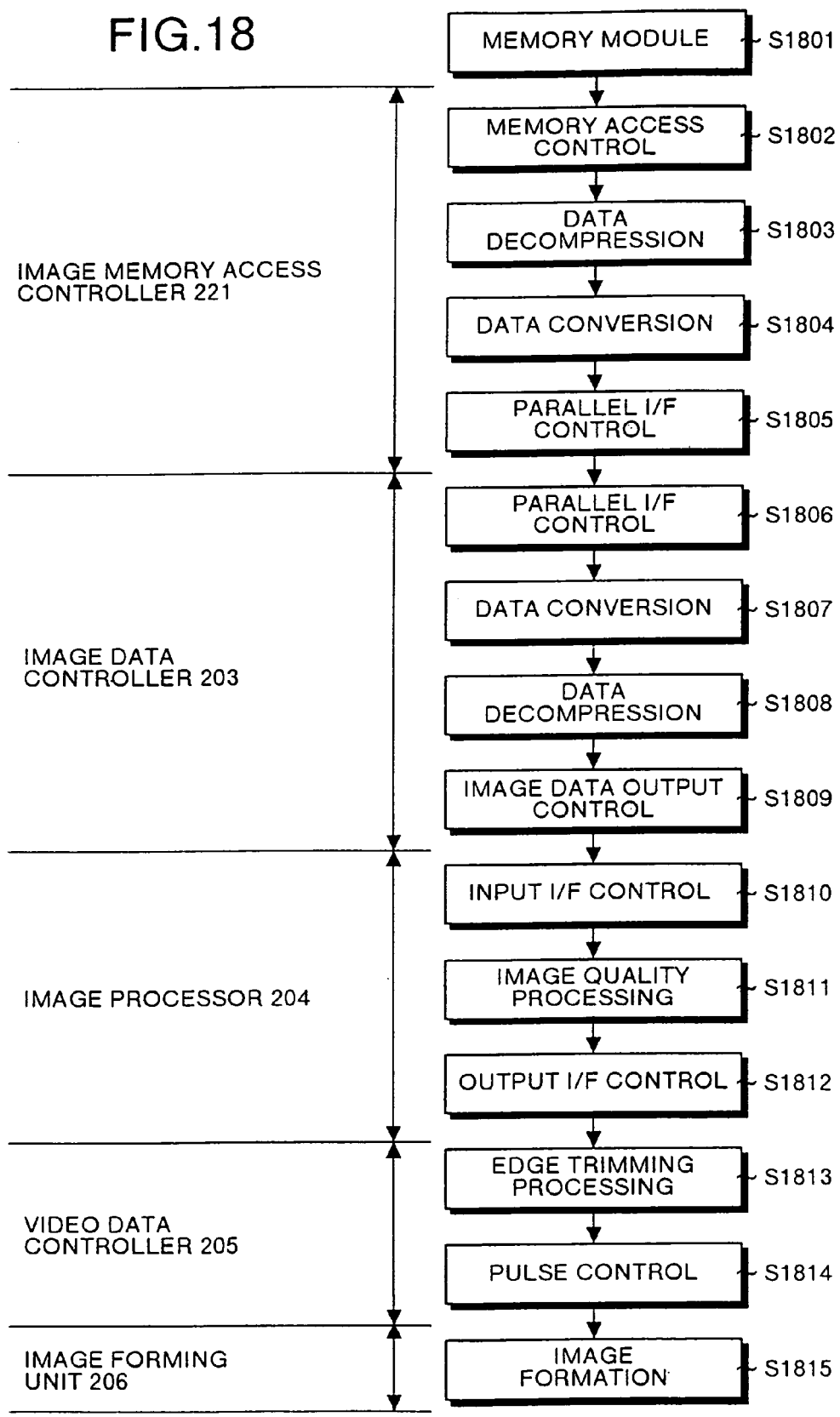
FIG. 18 is a flowchart illustrating the data flow of the image processing apparatus serving as the digital combined machine in which the processing of accumulating the images in the memory module 222 in the present embodiment is performed.

Next, a description will be given of the processing of accumulating the images in the memory module 222. FIG. 17 and FIG. 18 are flowcharts illustrating the data flow in the image processing apparatus serving as the digital combined machine which performs the processing of accumulating the images in the memory module 222 in the present embodiment.

FIG. 17 illustrates the flow from the reading unit 201 to the memory module 222. FIG. 18 illustrates the flow from the memory module 222 to the image forming unit 206. Each processing is performed by controlling the data flow between the buses and the units by the image data controller 203.

As shown in FIG. 17, the reading unit 201 and the sensor board unit 202 perform the reading control (step S1701). Subsequently, the image data controller 203 performs the input processing and output control of the image data (step S1702). Thereafter, the image processor 204 performs the input I/F control processing (step S1703), the above-described scanner image processing (step S1704), and then, the output I/F control processing (step S1705).

Next, the image data controller 203 performs the input processing of the image data again (step S1706), the data compression (step S1707), the data conversion (step S1708) and the parallel I/F control processing (step S1709).

Subsequently, the image memory access controller 221 performs the parallel I/F control processing (step S1710), the data conversion (step S1711), further data compression (step S1712), and the memory access control with respect to the memory module 222 (step S1713). Consequently, the image data is stored in the memory module 222 (step S1714).

As shown in FIG. 18, with respect to the image data stored in the memory module 222 (step S1801), the image memory access controller 221 performs the memory access control (step S1802), the data decompression (step S1803), the data conversion (step S1804) and the parallel I/F control processing (step S1805).

Next, the image data controller 203 performs the parallel I/F control processing (step S1806), the data conversion (step S1807), the data decompression (step S1808) and the image data output control (step S1809).

Thereafter, the image processor 204 performs the input I/F control processing (step S1810), the image quality processing (step S1811) and the output I/F control processing (step S1812).

Subsequently, the video data controller 205 performs the edge trimming processing (step S1813) and the pulse control (step S1814). Thereafter, the image forming unit 206 performs the image forming processing (step S1815).

In an independent fashion, the read image data is subjected to the scanner image processing in the image processor 204, and further, the image data to be output to the image forming unit 206 is subjected to the image quality processing in the image processor 204.

Additionally, the scanner image processing and the image quality processing can be performed in parallel. Therefore, the read image is processed for the facsimile transmission, and the image data previously accumulated in the memory module 222 can be output to a transfer sheet in parallel while changing the content of the image quality processing.

Figure 19:
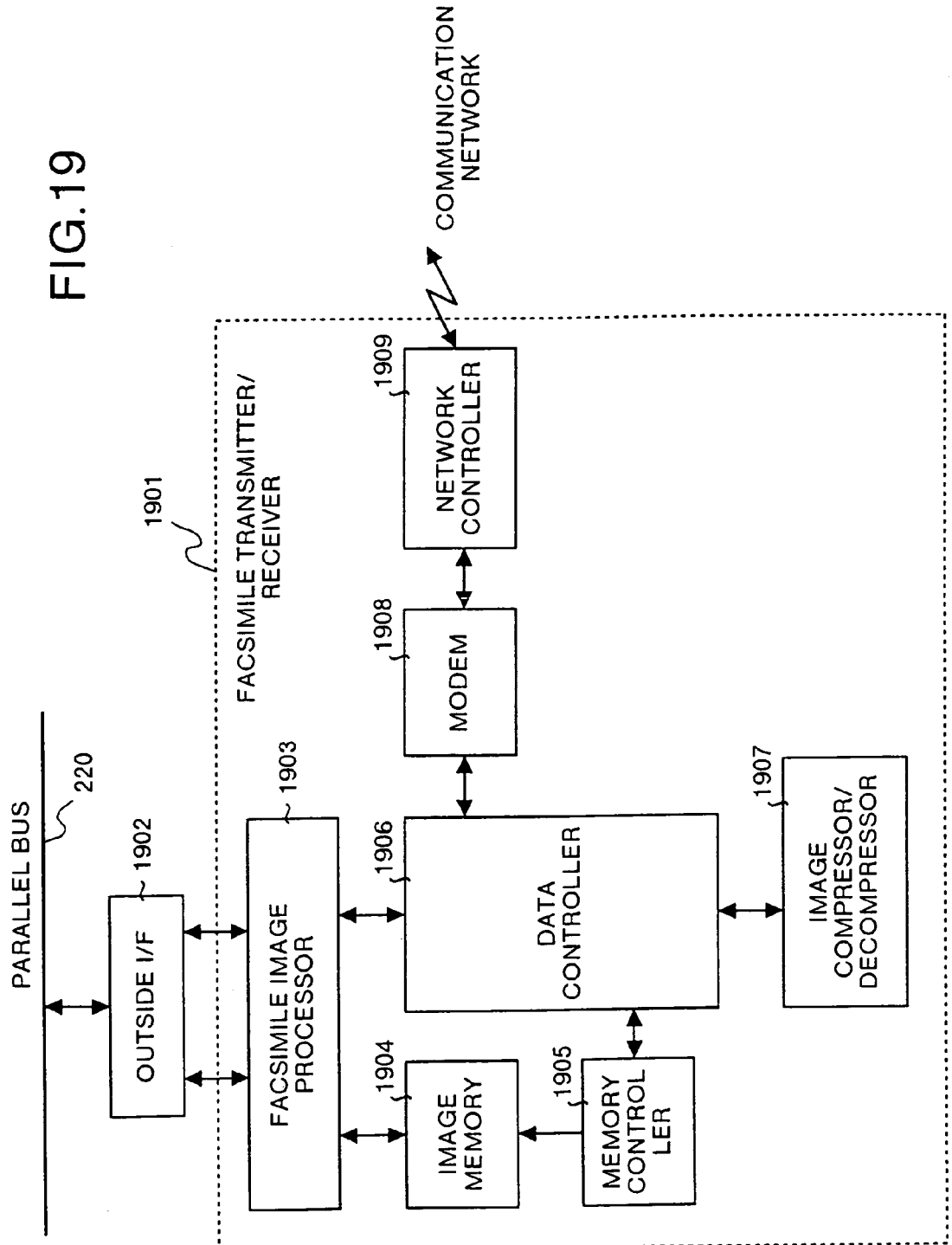
FIG. 19 is a block diagram illustrating the configuration of a facsimile control unit in the image processing apparatus in the present embodiment.

Next, a functional configuration of the facsimile control unit 224 will be explained here. FIG. 19 is a block diagram illustrating the configuration of the facsimile control unit 224 in the image processing apparatus in the present embodiment.

As shown in FIG. 19, the facsimile control unit 224 comprises a facsimile transmitter/receiver 1901 and an outside I/F 1902. Here, the facsimile transmitter/receiver 1901 converts image data into a format for the communications, so as to transmit it to an outside network; in contrast, the facsimile transmitter/receiver 1901 converts data from the outside into image data so as to record and output it in the image forming unit via the outside I/F 1902 and the parallel bus 220.

The facsimile transmitter/receiver 1901 includes a facsimile image processor 1903, an image memory 1904, a memory controller 1905, a data controller 1906, an image compressor/decompressor 1907, a modem 1908 and a network controller 1909.

In the facsimile image processor 1903, binary smoothing processing with respect to a received image is performed in the edge trimming processing 1001 inside the video data controller 205 illustrated in FIG. 10. In the image memory 1904, a part of an output buffer function is shifted to the image memory access controller 221 and the memory module 222.

In the facsimile transmitter/receiver 1901 such configured as described above, the data controller 1906 instructs the memory controller 1905 in starting the transfer of the image data, and thus, allows the memory controller 1905 to read the accumulated image data from the image memory 1904 in sequence. The read image data is restored into an original signal by the facsimile image processor 1903, followed by density changing processing and scaling processing, to be input into the data controller 1906.

The image data input into the data controller 1906 is encoded and compressed by the image compressor/decompressor 1907, is modulated by the modem 1908, and then, is sent to a destination via the network controller 1909. The image information which has been already transmitted is erased from the image memory 1904.

At the time of reception, a received image is accumulated once in the image memory 1904. At this time, if the received image can be recorded and output, the image is recorded and output at the timing of completion of the reception of the image by an amount of one sheet. Otherwise, when the facsimile transmitter/receiver 1901 is called during a copying operation to start the reception, the received image is accumulated in the image memory 1904 until a using ratio of the image memory 1904 reaches a predetermined value, for example, 80%. When the using ratio of the image memory 1904 reaches 80%, the writing operation performed at that time is forcibly interrupted, so that the received image is read out of the image memory 1904 to be thus recorded and output.

At this time, the received image read out of the image memory 1904 is erased from the image memory 1904. The interrupted writing operation is resumed at the time when the using ratio of the image memory 1904 is decreased down to, e.g., 10%. Upon completion of the entire writing operation, the remaining received image is recorded and output. Moreover, in order to resume the writing operation after the interruption, various parameters for the writing operation during the interruption are internally saved. At the time of resuming the writing operation, the parameters are internally restored. Incidentally, the image data processing performed in the facsimile control unit 224 may be performed in the image processor 204 according to the specifications.

Figure 20:
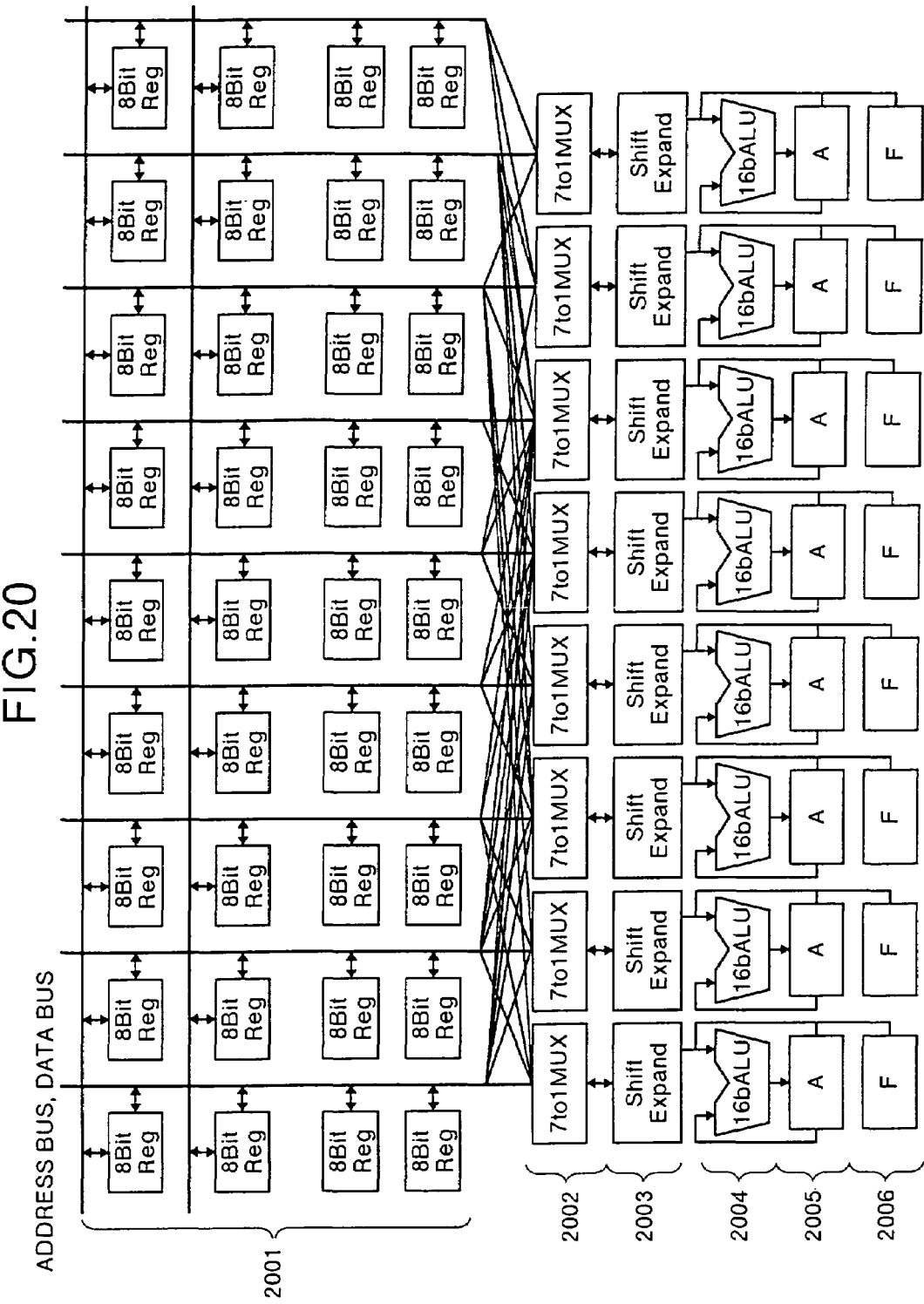
FIG. 20 is a diagram illustrating the schematic arrangement of an SIMD processor.
Figure 21:
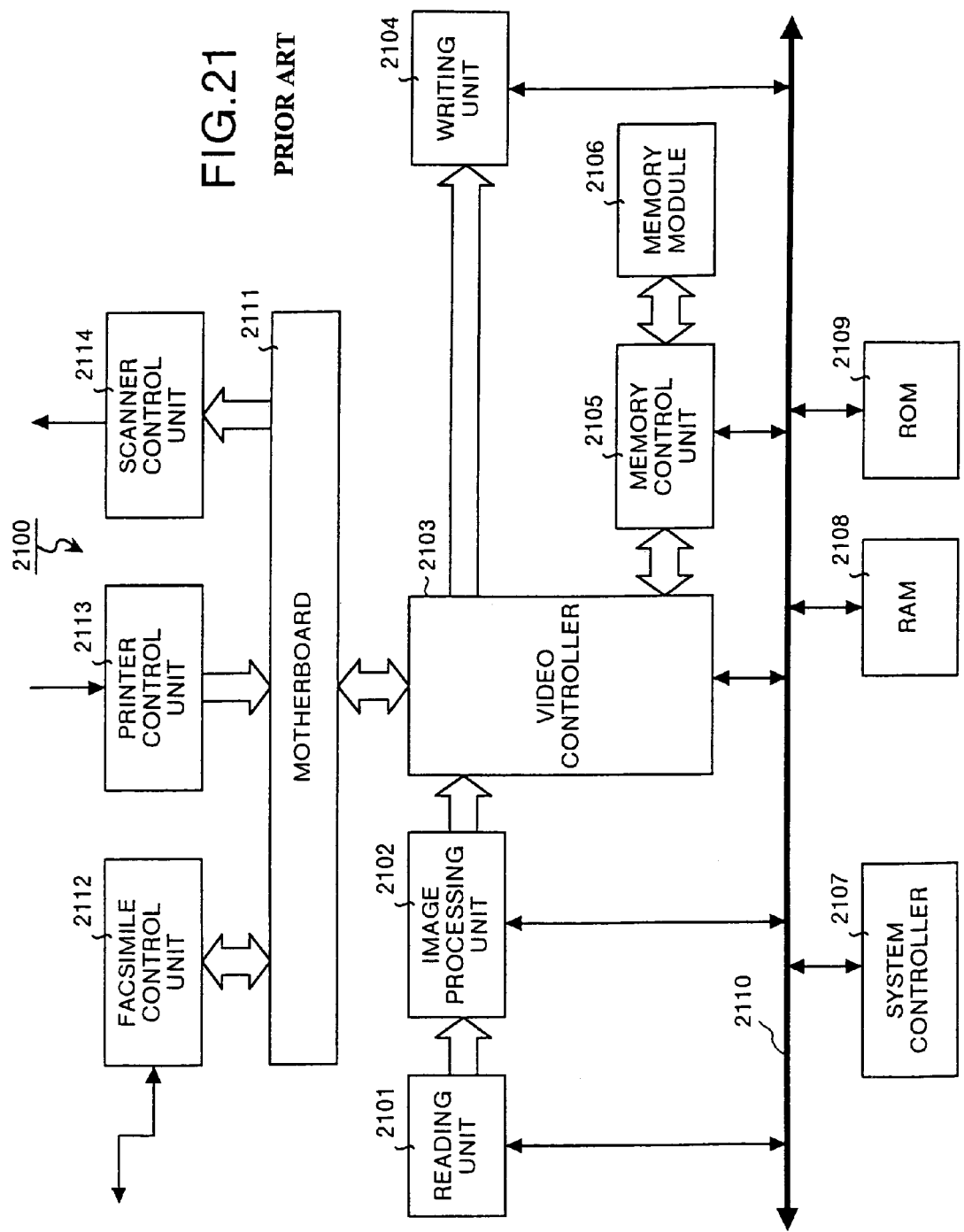
FIG. 21 is a block diagram illustrating the hardware configuration of a digital combined machine in the prior art.

FIG. 20 is a diagram illustrating the schematic arrangement of an SIMD (single-instruction-stream, multiple-data-stream) processor. In the SIMD, a single instruction is simultaneously executed with respect to a plurality of data. The SIMD processor comprises a plurality of processor elements (PE).

Each of the PEs comprises a register (Reg) 2001 for storing data therein, a multiplexer (MUX) 2002 for accessing a register of another PE, a barrel shifter (Shift Expand) 2003, an arithmetic and logical unit (ALU) 2004, an accumulator (A) 2005 for storing a logical result therein, and a temporary register (F) 2006 for temporarily saving the content of the accumulator 2005.

Each of the registers 2001 is connected to an address bus and a data bus (a lead and a word line), for storing therein a command code for defining the processing and the data to be processed. The content of the register 2001 is input into the arithmetic and logical unit 2004. The arithmetic result is stored in the accumulator 2005. In order to fetch the result outside of the PE, the result is once saved in the temporary register 2006. The content of the temporary register 2006 is fetched to thus obtain the processing result with respect to the target data.

The instruction code of the same content is given to each of the PEs by referring to the program RAM 505. The target data to be processed is given from the group 502 of bus switches/local memories in a different state per PE. The arithmetic results are processed in parallel by referring to the content of the register 2001 in the adjacent PE in the multiplexer 2002, to be thus output to the respective accumulators 2005.

For example, if the content of the image data of one line is arranged in the PE per pixel, followed by the arithmetic processing in accordance with the same instruction code, the processing result by the amount of one line can be obtained in a time shorter than in sequential processing per pixel. In particular, the instruction code per PE is expressed in an arithmetic expression as it is in the space filter processing and the shading correcting processing, so that the processing can be commonly performed with respect to all of the PEs.

As described above, according to the image processing apparatus of the present embodiment, even if the image data control unit also performs other process controls so as to relatively degrade the performance relating to the transfer of the processing information, the program can be rewritten or added without any trouble by previously transferring the processing information to the host buffers, and further, the image processing can be performed based on the processing information stored in the host buffers. Consequently, the plurality of image processing can be efficiently performed without degrading the productivity even during the operation of the apparatus.

Furthermore, since the process controller is connected directly to the host buffers via the serial bus, it is possible to make it unnecessary to additionally provide special hardware. In view of this, the image processing apparatus can be reduced in size and cost.

Furthermore, since the program can be rewritten or added without any interruption of the image processing, it is possible to shorten a waiting time in the processor array so as to achieve the efficient image processing with high productivity.

Furthermore, the procedures of the image processing can be monitored without any interruption of the image processing, thus speedy min the case of occurrence of abnormality.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
an entirety controlling unit connected to at least two units out of an image reading unit for reading an image data, an image memory control unit which controls an image memory so as to write/read the image data, an image processing unit which subjects the image data to an image processing and an image writing unit for writing the image data on a paper, wherein said entirety controlling unit controls processing between said units and transmission/reception of the image data between the units; and
a memory unit which previously stores a processing information on a content of the image processing with respect to the image data,
wherein said entirety controlling unit reads a part of the processing information stored in said memory unit and stores the read information in a storage unit provided in said image processing unit, and
said image processing unit subjects the image data to the image processing based on the processing information stored in said storage unit.

2. The image processing apparatus according to claim 1, wherein said image processing unit includes:
a processing information memory unit which stores the processing information which is referred to in subjecting the image data to the image processing; and
a processing information controlling unit which controls the transmission/reception of the processing information which is referred to in subjecting the image data to the image processing between said storage unit and said processing information memory unit.

3. The image processing apparatus according to claim 2, further comprising a processing period detecting unit which detects whether or not said image processing unit is subjecting the image data to the image processing;
wherein said processing information controlling unit transmits/receives the processing information which is referred to in subjecting the image data to the image processing between said storage unit and said processing information memory unit when said processing period detecting unit detects that said image processing unit is not subjecting the image data to the image processing.

4. The image processing apparatus according to claim 1, wherein the control performed by said entirety controlling unit is performed by an image processor which manages the entire image processing apparatus.

5. The image processing apparatus according to claim 1, wherein the image processing includes editing the image data.

6. An image processing apparatus comprising:
an entirety controlling unit connected to at least two units out of an image reading unit for reading image data, an image memory control unit which controls an image memory so as to write/read the image data, an image processing unit which subjects the image data to an image processing and an image writing unit for writing the image data on a paper, wherein said entirety controlling unit controls processing between said units and transmission/reception of the image data between the units; and
a memory unit which previously stores processing information on a content of the image processing with respect to the image data;
wherein said entirety controlling unit controls the processing information until the completion of the storage of the processing information when reading a part of the processing information stored in the memory unit to then store it in a storage unit contained inside the image processing unit; and
said image processing unit subjects the image data to the image processing based on the processing information stored in said storage unit.

7. The image processing apparatus according to claim 6, wherein said image processing unit includes:
a processing information memory unit which stores the processing information which is referred to in subjecting the image data to the image processing; and
a processing information controlling unit which controls the transmission/reception of the processing information which is referred to in subjecting the image data to the image processing between said storage unit and said processing information memory unit.

8. The image processing apparatus according to claim 7, further comprising a processing period detecting unit which detects whether or not said image processing unit is subjecting the image data to the image processing,
wherein said processing information controlling unit transmits/receives the processing information which is referred to in subjecting the image data to the image data to the image processing between said storage unit and said processing information memory unit when said processing period detecting unit detects that said image processing unit is not subjecting the image data to the image processing.

9. The image processing apparatus according to claim 6, wherein the control performed by said entirety controlling unit is performed by an image processor which manages the entire image processing apparatus.

10. The image processing apparatus according to claim 6, wherein the image processing includes editing the image data.

11. An image processing apparatus comprising:
an entirety controlling unit connected to at least two units out of an image reading unit for reading image data, an image memory control unit which controls an image memory so as to write/read the image data, an image processing unit which subjects the image data to an image processing and an image writing unit for writing the image data on a paper, wherein said entirety controlling unit controls processing between said units and transmission/reception of the image data between the units; and a storage unit provided in said image processing unit, wherein said storage unit stores a processing information on a content of the image processing with respect to the image data, wherein said image processing unit subjects the image data to the image processing based on the processing information stored in said storage unit, and said entirety controlling unit is configured to read the processing information stored in said storage unit to monitor the image processing by the image processing unit.

12. The image processing apparatus according to claim 11, wherein said image processing unit includes:

a processing information memory unit which stores the processing information which is referred to in subjecting the image data to the image processing; and a processing information controlling unit which controls the transmission/reception of the processing information which is referred to in subjecting the image data to the image processing between said storage unit and said processing information memory unit.

13. The image processing apparatus according to claim 12, further comprising a processing period detecting unit which detects whether or not said image processing unit is subjecting the image data to the image processing, wherein said processing information controlling unit transmits/receives the processing information which is referred to in subjecting the image data to the image processing between said storage unit and said processing period detecting unit detects that said image processing unit is not subjecting the image data to the image processing.

14. The image processing apparatus according to claim 12, wherein the control performed by said entirety controlling unit is performed by an image processor which manages the entire image processing apparatus.

15. The image processing apparatus according to claim 11, wherein the image processing includes editing the image data.

16. An image processing apparatus comprising:

an image processing unit which processes an image data, said image processing unit including a storage unit;

at least one unit out of:

an image reading unit which acquires the image data, an image memory control unit which controls an image memory so as to write/read the image data, an image writing unit which generates an image on a media based on the image data, and a memory unit which previously stores information about how the image data is to be processed by said image processing unit;

a controlling unit which provides controls over the processing and flow of data between said image processing unit, said least one unit, and said memory unit, wherein said entirety controlling unit reads a part or whole of the information stored in said memory unit and transfers the read information in said storage unit of said image processing unit; and said image processing unit processes the image data based on the information stored in said storage unit.

17. The image processing apparatus according to claim 16, wherein the image processing includes editing the image data.

* * * * *